(12) United States Patent
Turner et al.

(10) Patent No.: US 11,599,468 B1
(45) Date of Patent: Mar. 7, 2023

(54) MARSHALLED DATA COHERENCY

(71) Applicant: QUALCOMM INCORPORATED, San Diego, CA (US)

(72) Inventors: Andrew Edmund Turner, San Diego, CA (US); George Patsilaras, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/538,365

(22) Filed: Nov. 30, 2021

(51) Int. Cl.
*G06F 12/08* (2016.01)
*G06F 12/084* (2016.01)
*G06F 12/0813* (2016.01)
*G06F 12/0831* (2016.01)

(52) U.S. Cl.
CPC ........ *G06F 12/084* (2013.01); *G06F 12/0813* (2013.01); *G06F 12/0833* (2013.01); *G06F 2212/7207* (2013.01)

(58) Field of Classification Search
None
See application file for complete search history.

(56) References Cited

U.S. PATENT DOCUMENTS

| | | | |
|---|---|---|---|
| 10,503,643 B1* | 12/2019 | Rychlik | G06F 12/0822 |
| 11,269,784 B1* | 3/2022 | Siemssen | G06F 16/172 |
| 2018/0089095 A1* | 3/2018 | Li | G06F 11/1076 |
| 2019/0087345 A1* | 3/2019 | Hijaz | G06F 12/0897 |
| 2020/0104258 A1* | 4/2020 | Purushotham | G06F 12/121 |
| 2021/0303476 A1* | 9/2021 | Yang | G06F 12/0891 |

* cited by examiner

*Primary Examiner* — Tracy C Chan
(74) *Attorney, Agent, or Firm* — Smith Tempel Blaha LLC/Qualcomm

(57) ABSTRACT

Memory system features may promote cache coherency where first and second memory clients may attempt to work on the same data. A second client cache system may provide a read request for data and associated metadata. The metadata element may be detected in a first client cache system. The first client cache system may write or flush, such as to a system memory, one or more cache lines containing the metadata and associated data and invalidate the flushed cache lines. The second client cache system may receive the data and metadata, such as from the system memory, completing or fulfilling the read request.

19 Claims, 26 Drawing Sheets

MARSHALLED DATA COHERENCY

DESCRIPTION OF THE RELATED ART

A computing device may include multiple subsystems, cores or other components. Such a computing device may be, for example, a portable computing device ("PCD"), such as a laptop or palmtop computer, a cellular telephone or smartphone, portable digital assistant, portable game console, etc.

The multiple subsystems, cores or other components of a computing device may be included within the same integrated circuit chip or in different chips. A "system-on-a-chip" or "SoC" is an example of one such chip that integrates numerous components to provide system-level functionality. For example, an SoC may include one or more types of processors, such as central processing units ("CPU"s), graphics processing units ("GPU"s), digital signal processors ("DSP"s), and neural processing units ("NPU"s). An SoC may include other processing subsystems, such as a transceiver or "modem" subsystem that provides wireless connectivity.

A computing device may include resources that are shared among SoC processors or other processing subsystems. For example, processors may share access to a main or system memory of the computing device. A processor may also be associated with a local cache memory.

"Cache coherency" is the property by which copies of the same (or "shared") data in the local cache memories associated with various processors have the same values, i.e., are identical. Techniques and protocols may be provided to promote or enhance cache coherency. In a cache coherency technique referred to as snooping, a snoop controller or cache coherency controller monitors bus transactions initiated by processors and updates local cache memories accordingly.

Some types of data have associated metadata. For example, metadata associated with compressed data may contain information about the compression ratio, location of data, etc. To decompress data, a processor may first need to obtain the associated metadata. Conventional cache coherency techniques may treat data and metadata as disjoint. That is, whether a cache line in a local cache memory contains data or metadata may be irrelevant or transparent to conventional cache coherency techniques. Improved cache coherency techniques may be needed to help ensure data and associated metadata are kept updated in synchronism with each other.

SUMMARY OF THE DISCLOSURE

Systems, methods, computer-readable media, and other examples are disclosed for providing cache coherency in a computing device.

An exemplary method for providing cache coherency may include a second client cache system requesting to read a data element that has an associated metadata element. The exemplary method may also include detecting the metadata element in a first client cache system in response to the read request. The exemplary method may further include the first client cache system writing one or more cache lines containing the metadata element and all data elements associated with the metadata element. The exemplary method may still further include the first client cache system invalidating the metadata element in the first client cache system. The exemplary method may yet further include completing or fulfilling the read request, which may include the second client cache system receiving the metadata element and all data elements associated with the metadata element.

An exemplary system for providing cache coherency may include a first client cache system and a second client cache system. The second client cache system may be configured to provide a read request to read a data element having an associated metadata element. The second client cache system may further be configured to detect the metadata element in the first client cache system in response to the read request. The first client cache system may be configured to write one or more cache lines containing the metadata element and all data elements associated with the metadata element. The first client cache system may further be configured to invalidate the metadata element in the first client cache system. The second client cache system may still further be configured to complete or fulfill the read request by being configured to receive the metadata element and all data elements associated with the metadata element.

Another exemplary system for providing cache coherency may include means for requesting to read a data element having an associated metadata element. The exemplary system may also include means for detecting the metadata element in a first client cache system in response to the read request. The exemplary system may further include means for writing one or more cache lines containing the metadata element and all data elements associated with the metadata element. The exemplary system may still further include means for invalidating the metadata element in the first client cache system. The exemplary system may yet further include means for completing or fulfilling the read request, including means for receiving the metadata element and all data elements associated with the metadata element in the second client cache system.

An exemplary computer-readable medium for providing cache coherency may comprise a non-transitory computer-readable medium having instructions stored thereon in computer-executable form. The instructions, when executed by a processing system of a computing device, may configure the processing system to do the following. The instructions may configure the processing system to control requesting to read, by a second client cache system, a data element having an associated metadata element. The instructions may also configure the processing system to detect the metadata element in a first client cache system in response to the read request. The instructions may further configure the processing system to control writing, by the first client cache system, one or more cache lines containing the metadata element and all data elements associated with the metadata element. The instructions may still further configure the processing system to control invalidating, by the first client cache system, the metadata element in the first client cache system. The instructions may yet further configure the processing system to control completing or fulfilling the read request, which may include the second client cache system receiving the metadata element and all data elements associated with the metadata element.

BRIEF DESCRIPTION OF THE DRAWINGS

In the Figures, like reference numerals refer to like parts throughout the various views unless otherwise indicated. For reference numerals with letter character designations such as "102A" or "102B", the letter character designations may differentiate two like parts or elements present in the same Figure. Letter character designations for reference numerals may be omitted when it is intended that a reference numeral to encompass all parts having the same reference numeral in all Figures.

DETAILED DESCRIPTION

The word "exemplary" is used herein to mean "serving as an example, instance, or illustration." The word "illustrative" may be used herein synonymously with "exemplary." Any aspect described herein as "exemplary" is not necessarily to be construed as preferred or advantageous over other aspects.

The term "marshalled data" may refer to data of a type in which there are associations among data elements that do not change based on processing. An example of marshalled data is data with metadata. Each data element is associated with a metadata element. An example of metadata is information about compression ratio, location of data, etc., associated with compressed data. To decompress a data element, a decompression algorithm may require the metadata element associated with the data element. For example, to decompress a data element "A" the decompression algorithm may use as its inputs the value of the data element A and the value of a metadata element "X." The values of A and X may change as a result of processing, but A and X remain associated with one another as data and metadata elements regardless of such changes in their values. Another example of metadata is error-correcting information associated with error-protected data. Still other examples of data that may have associated metadata are encrypted data and tagged data. Although exemplary embodiments of providing cache coherency described below use compressed data as an example of data having associated metadata, the solutions described herein may provide cache coherency using any other type of data having associated metadata.

Figure 1:
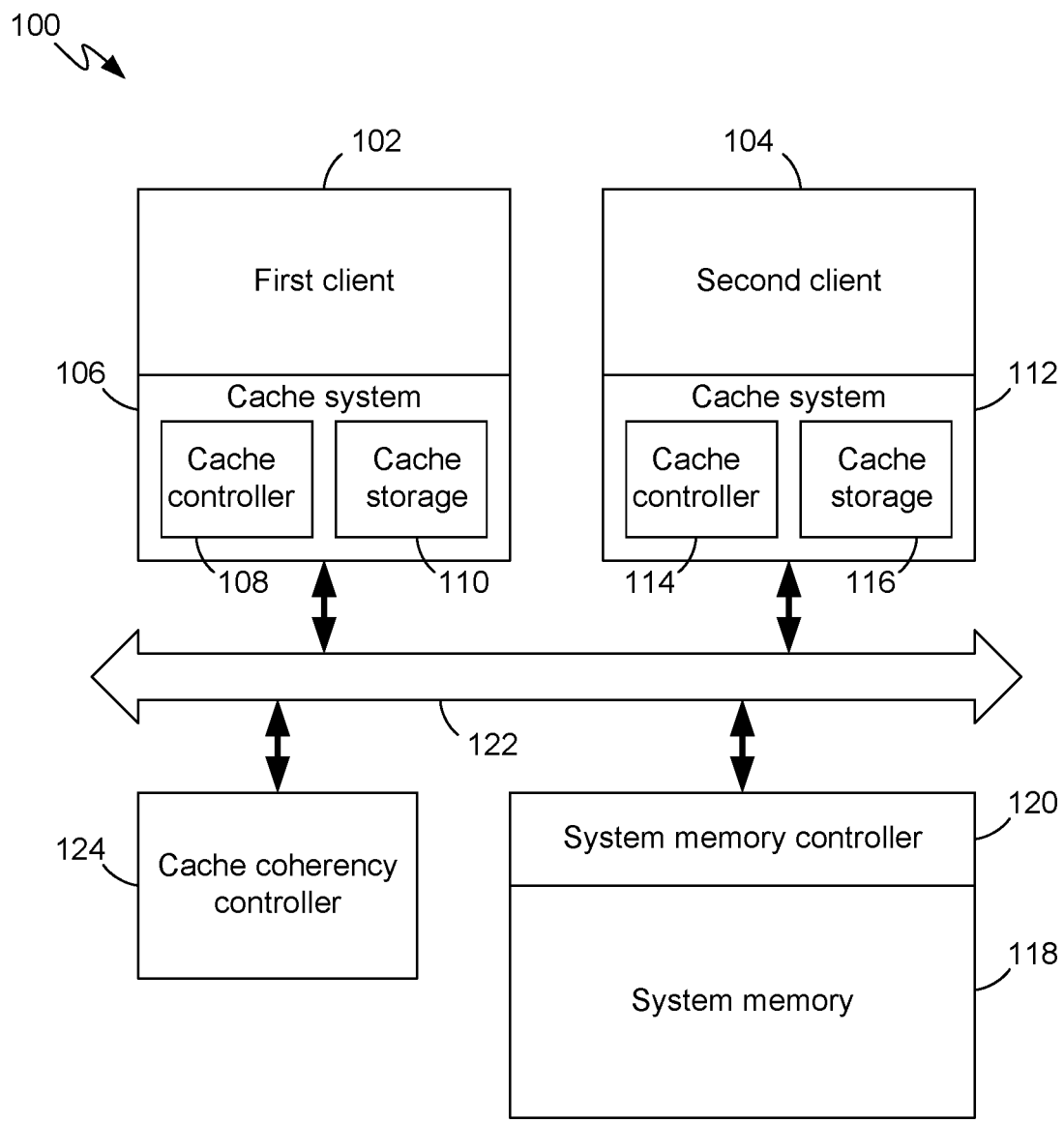
FIG. 1 is a block diagram illustrating a system for providing cache coherency, in accordance with exemplary embodiments.

As shown in FIG. 1, a system 100 may include a first client 102 and a second client 104. Although two clients 102 and 104 are shown in the exemplary system 100, in other examples there may be more than two clients, and the solutions described herein may be applied to such additional clients in the manner described with regard to the exemplary clients 102 and 104. Each client 102 and 104 may comprise, for example, a processor, processing system, or portion thereof, such as a core (not shown in FIG. 1), as configured by software or firmware in execution.

A first client cache system 106 may be coupled to or otherwise associated with the first client 102. The first client cache system 106 may include a first cache controller 108 and first cache storage 110 (i.e., memory). The first client cache system 106 may be configured to operate as a local cache of the first client 102. Similarly, a second client cache system 112 may be coupled to or otherwise associated with the second client 104. The second client cache system 112 may include a second cache controller 114 and second cache storage 116 (i.e., memory). The second client cache system 112 may be configured to operate as a local cache of the second client 104. The first cache storage 110 and second cache storage 116 may comprise any type of memory, such as, for example, static random access memory ("SRAM"), flash memory, etc. Although some operations performed by the first and second client cache systems 106 and 112 may be autonomous, more generally the first and second client cache systems 106 and 112 operate under control of their respective clients 102 and 104. Nevertheless, for purposes of brevity, the operation of the system 100 may be described below in terms of actions performed by the first and second client cache systems 106 and 112.

In the illustrated example, the first and second clients 102 and 104 are clients of a system memory 118. That is, the first and second clients 102 and 104 are configured to access the system memory 118. A system memory controller 120 may control access to (i.e., reading from and writing to) the system memory 118 in response to memory access requests such as read requests and write requests. The system memory 118 may comprise any type of memory, such as, for example, dynamic random access memory ("DRAM"). The DRAM may be, for example, double data-rate synchronous DRAM or "DDR-SDRAM," sometimes referred to for brevity as "DDR." Although such read and write requests may originate through operation of the first and second clients 102 and 104, for purposes of brevity in the operational descriptions below, read and write requests may be described as provided by the first and second client cache systems 106 and 112.

A data interconnect 122 may be configured to provide data communication among the first client 102, second client 104 and system memory 118 (via the system memory controller 120). The data interconnect 122 may be configured to route signals representing bus transactions, such as read requests and write requests, among the foregoing elements. Although in the examples described herein a system memory such as DDR may serve as intermediary storage shared by first and second clients, in other examples such intermediary or shared storage could be a system-level cache or any other type of storage shared by clients. For purposes of the present disclosure, the term "system memory" includes within its scope of meaning all such shared storage.

The system 100 may also include a cache coherency controller 124, which may also be referred to as a snoop controller or snoop filter. As understood by one of ordinary skill in the art, snooping is a technique in which a controller monitors bus transactions for addresses representing data that has been cached or stored in local cache memories, and updates information in the local cache memories to provide coherency among the local cache memories. When a value of a shared data element is modified (e.g., by a processor), a snoop controller may propagate the change to other local cache memories that have a copy of (or "share") the data element. In the example illustrated in FIG. 1, the cache coherency controller 124 may be configured to perform such snooping on the interconnect 122 and to update information in the first cache storage 110 and second cache storage 116. Except as may be described below, the cache coherency controller 124 may be configured to perform such snooping and updating in a conventional manner. For example, except as may be described below, the cache coherency controller 124 may be configured to implement a conventional cache coherency protocol, as understood by one of ordinary skill in the art. One example of such a cache coherency protocol is known as MESI in reference to tagging cache lines with a tag indicating one of four states: Modified, Exclusive, Shared, and Invalid. Other cache coherency protocols, such as, for example, MSI (Modified, Shared, Invalid), and MOESI (Modified, Owned, Exclusive, Shared, Invalid) are also known. As the manner in which a snoop controller or cache coherency controller can be configured to implement such cache coherency protocols is well understood by one of ordinary skill in the art, such aspects of the cache coherency controller 124 are not described herein.

The first and second cache controllers 108 and 114 may also include some cache coherency or snooping logic. Some cache coherency features described below may be controlled in part by such logic in the first and second cache controllers 108 and 114 rather than by the cache coherency controller 124 alone. For example, the first cache controller 108 may be configured to determine with the assistance of the cache coherency controller 124 whether a data or metadata element is present in the second cache storage 116. Likewise, the second cache controller 114 may be configured to determine with the assistance of the cache coherency controller 124 whether a data or metadata element is present in the first cache storage 110.

Figure 2:
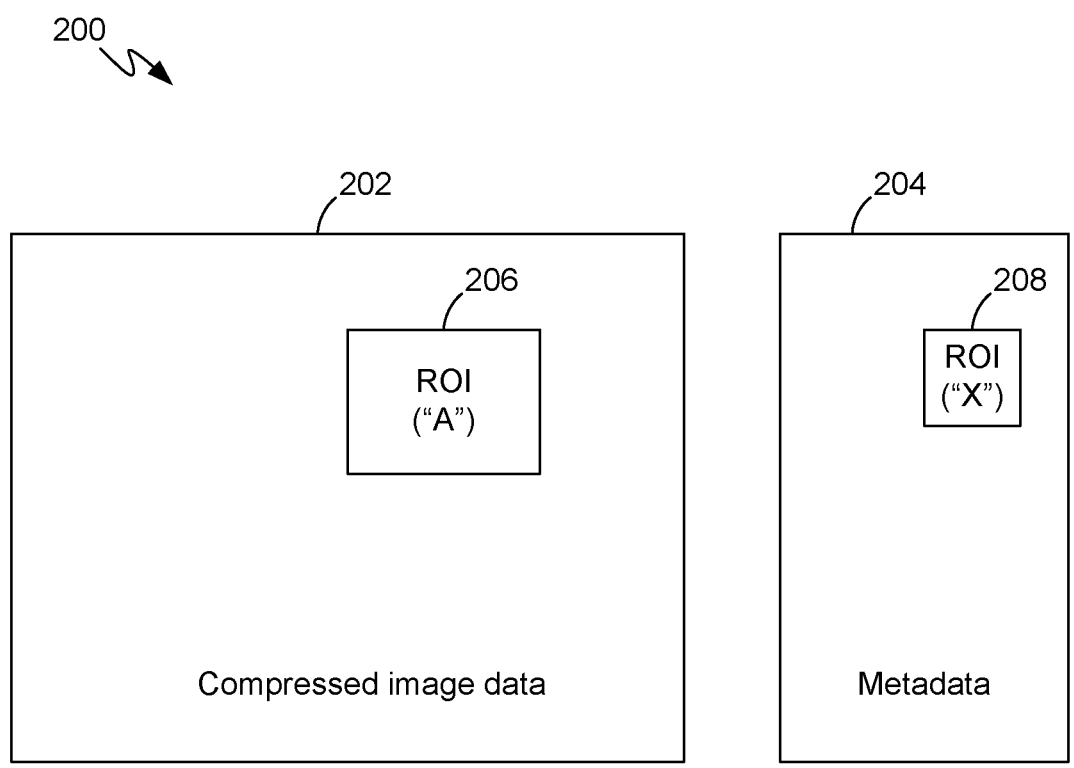
FIG. 2 illustrates an example of a region of interest in compressed image data, including data and associated metadata, in accordance with exemplary embodiments.

As shown in FIG. 2, an image (e.g., an array of pixels, stored in a compressed form) 200 may comprise compressed image data 202 and associated metadata 204 relating to the compression. Either of the first or second clients 102 and 104 (FIG. 1) may work on (e.g., read data from, process the data, and write resulting data back to) a region of the image, which may be referred to as a region of interest ("ROI"). The ROI may be represented by an ROI data portion 206 or data element of the compressed image data 202 and an associated ROI metadata portion 208 or metadata element of the metadata 204. In the examples described below, an ROI data portion 206 or data element may be referred to as A, B, C, D, etc. Similarly, an ROI metadata portion 208 or metadata element may be referred to as X, Y, etc. The term "tile" may be used to refer to a group of one or more ROIs. A single metadata element may be associated with any number of data elements. For example, in a tile consisting of data elements A and B, metadata element X may be associated with data element A and associated with data element B. Similarly, in another tile consisting of data elements C and D, metadata element Y may be associated with data elements A and B.

To work on, and in particular, to decompress a tile, the client 102 or 104 (FIG. 1) may first need to read the one or more associated metadata elements. The client 102 or 104 can then read the data elements of the tile and use the retrieved metadata elements to decompress the tile. It is generally not possible to read the data elements of a tile and the associated metadata elements of the tile simultaneously or write the data elements of a tile and the associated metadata elements of the tile simultaneously. As a result of this asynchronism, various operational scenarios in which the first and second clients 102 and 104 attempt to work concurrently on the same ROI may raise potential cache coherency problems. The exemplary methods, systems, computer-readable media, and other embodiments of providing cache coherency described below may address such potential cache coherency problems.

Figure 3:
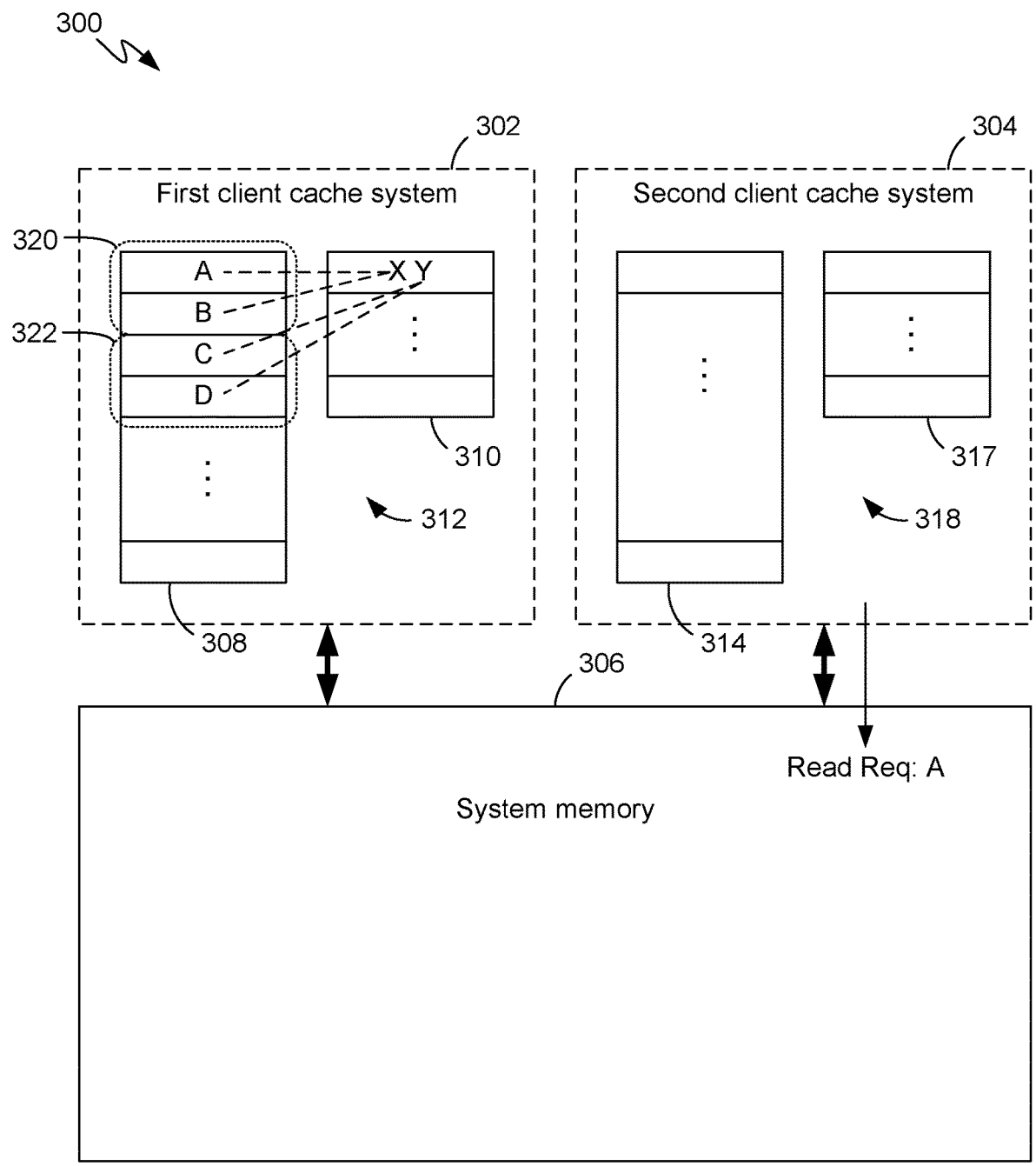
FIG. 3 is a functional block diagram illustrating an example of operation of a system for providing cache coherency, in accordance with exemplary embodiments.

In FIG. 3, a system 300 similar to the above-described system 100 (FIG. 1) is shown in a more conceptual or functional block diagram form for purposes of clarity. Some elements of the system 300 similar to elements described above with regard to the system 100 (FIG. 1) are not shown in FIG. 3 for purposes of clarity of description of the operation of the system 300. A first client cache system 302 and a second client cache system 304 may operate in the manner described above with regard to the first client cache system 102 and second client cache system 104 (FIG. 1). Under control of corresponding first and second clients (not shown in FIG. 3), each of the first and second client cache systems 302 and 304 may issue read requests to read data elements and metadata elements from a system memory 306 and write requests to write data elements and metadata elements to the system memory 306. Although not shown in FIG. 3 for purposes of clarity, a system memory controller may be coupled to the system memory 306 and provide control features as described above with regard to the system memory controller 120 (FIG. 1). Although also not shown in FIG. 3 for purposes of clarity, a snoop controller or cache coherency controller may be included and configured to monitor bus transactions and otherwise function as described above with regard to the cache coherency controller 124 (FIG. 1).

The first client cache system 302 may include first cache storage 312. Data elements may be conceptually depicted as stored in a data region 308 of the first cache storage 312, and metadata elements may be conceptually depicted as stored in a metadata region 310 of the first cache storage 312. Nevertheless, it should be understood that the data region 308 and metadata region 310 may not be physically distinct, i.e., they may be the same physical cache memory. For example, data and metadata elements may be stored in various locations within a first cache storage 312, and whether they are data or metadata may be tracked or indicated by storage location address, by a tag or other stored indicator (not shown), or in any other way. For example, a certain address range may indicate data while a different address range may indicate metadata. Likewise, the second client cache system 304 may include second cache storage 318. Data elements may be conceptually depicted as stored in a data region 314 of the second cache storage 318, and metadata elements may be conceptually depicted as stored in a metadata region 317 of the second cache storage 318.

The first and second cache storage 312 and 318 may be organized in cache lines. Cache coherency logic (not separately shown) of the first and second client cache systems 302 and 304 may keep track of which cache lines contain data and which cache lines contain metadata and of the associations between the data elements and metadata elements.

An example of operation of the system 300 is described with reference to FIGS. 3-6. As shown in FIG. 3, data elements A, B, C and D and metadata elements X and Y may be stored in or reside in the first client cache system 302 as a result of various processing occurring under control of the first client (not shown). That is, a state in which data elements A, B, C and D and metadata elements X and Y reside in the first client cache system 302 represents an initial state in this example. The processing may be of any type, such as, for example, processing an image in the form of compressed pixel data as described above with regard to FIG. 2. Such processing may also be referred to herein for convenience as "working on" ROIs. For example, under control of a first client (not shown), the first client cache system 302 may have read data elements A, B, C and D and metadata elements X and Y from the system memory 306. It may be noted that in the illustrated example (FIG. 3) each of data elements A, B, C and D is stored in a separate cache line, while metadata elements X and Y are stored in the same cache line as each other. In the illustrated example the metadata element X is associated with data elements A and B, which may form a tile 320. Similarly, the metadata element Y is associated with data elements C and D, which may form a tile 322. In the examples shown herein, associations between data elements and metadata elements are indicated by a dashed or broken line between associated elements.

In the illustrated example (FIGS. 3-6), the second client (not shown) may attempt to work on an ROI that the first client (not shown) is working on. The solutions described through this example address potential coherency problems that could otherwise arise as a result of the two clients attempting to work concurrently on the same ROI. For purposes of brevity in the following examples, actions performed by the first client cache system 302 or second client cache system 304 under control of their respective or corresponding clients may be described without accompanying reference to the underlying client. Accordingly, a first action in the illustrated example may be that the second client cache system 304 provides or issues a read request for data element A.

Although not shown for purposes of clarity, the read request for the data element A may include a pre-request for the associated metadata element X (or for the cache line containing the metadata element X), which the second client may require to perform decompression. The data elements may be stored in or reside in the system memory 306 in compressed form and may be stored in or reside in the first and second client cache systems 302 and 304 in uncompressed form. Memory controllers (not separately shown in FIG. 3) may be configured to operate together to fulfill the read request from the second client cache system 304. Such memory controllers may be similar to the above-described (FIG. 1) system memory controller 120, first cache controller 108, and second cache controller 114. A read request is completed or fulfilled when the requested data is returned to the requesting client cache system.

Cache coherency logic, portions of which may be in the first client cache system 302, the second client cache system 304, and/or a separate cache coherency or snoop controller (not shown in FIG. 3) may respond to the read request for metadata element X. For example, a cache coherency or snoop controller may detect the bus transaction relating to the read request for metadata element X. In response to the read request for metadata element X, the cache coherency logic may determine that metadata element X is in the first client cache system 302 and has a valid state.

Figure 4:
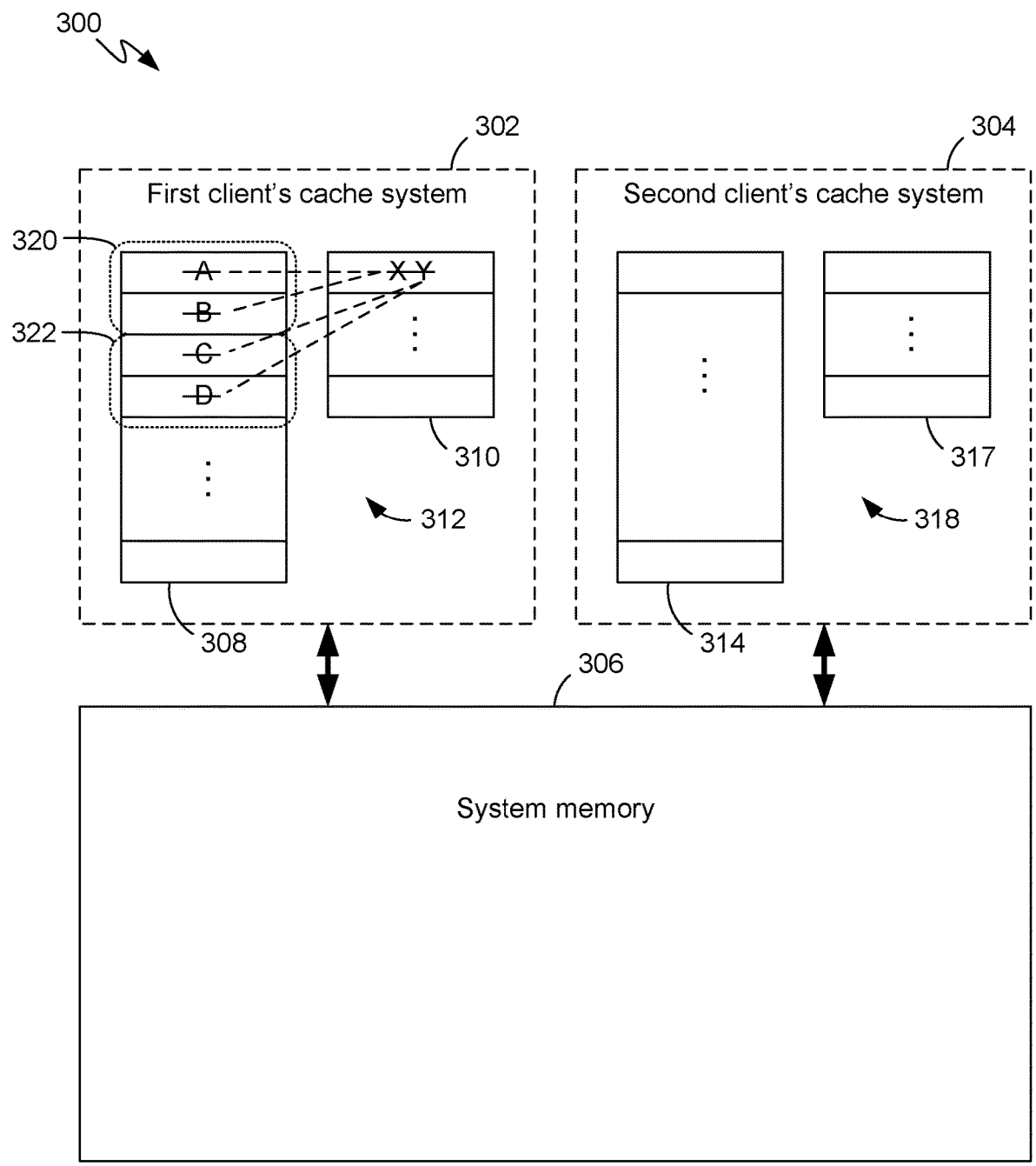
FIG. 4 is similar to FIG. 3, illustrating actions in the example of operation of the system of FIG. 3.

As shown in FIG. 4, in response to the determination that metadata element X is in the first client cache system 302 and has a valid state, the first client cache system 302 may invalidate the cache line containing metadata element X. Throughout the examples herein, invalidation of a data or metadata element is depicted by a horizontal bar or line through the data or metadata element. Because the first client cache system 302 invalidates the cache line containing metadata element X, the first client cache system 302 may also invalidate all cache lines containing data elements associated with metadata element X, which in this example are data elements A and B. Because the cache line containing metadata element X also contains metadata element Y, the first client cache system 302 may also invalidate all cache lines containing data elements associated with metadata element Y, which in this example are data elements C and D. In other words, the requested metadata element is invalidated, as are all other metadata elements in the same cache line as the requested metadata element and all data elements associated with those metadata elements.

Figure 5:
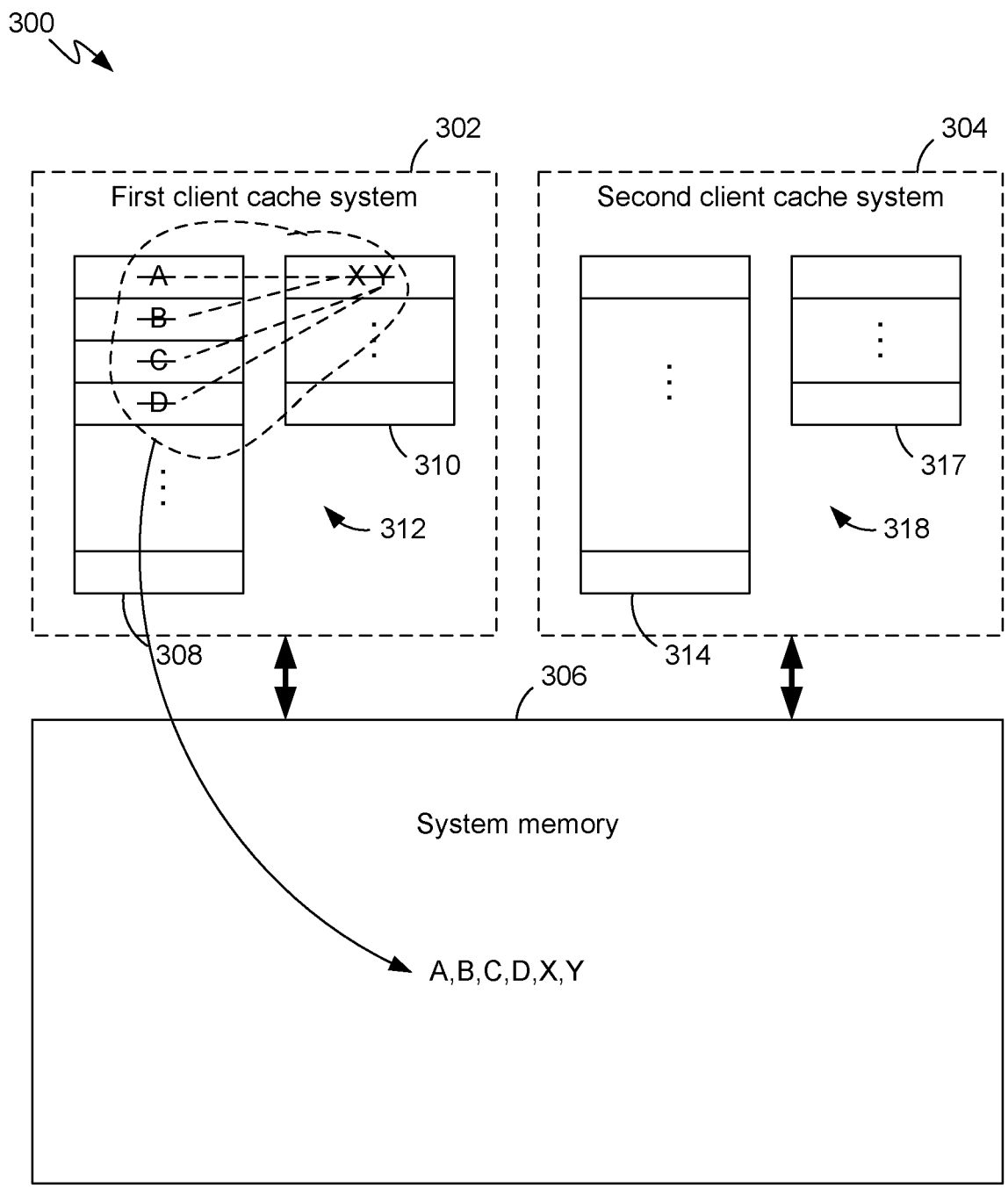
FIG. 5 is similar to FIGS. 3-4, illustrating further actions in the example of operation of the system of FIGS. 3-4.

As shown in FIG. 5, also in response to the determination that metadata element X is in the first client cache system 302 and has a valid state, the first client cache system 302 may flush or write to the system memory 306 the cache line containing the requested metadata element X, the cache lines containing data elements A and B because they are associated with metadata element X, and the cache lines containing data elements C and D because they are associated with metadata element Y (which is in the same cache line as metadata element X). This writing or flushing of cache lines may occur concurrently with their invalidation.

Figure 6:
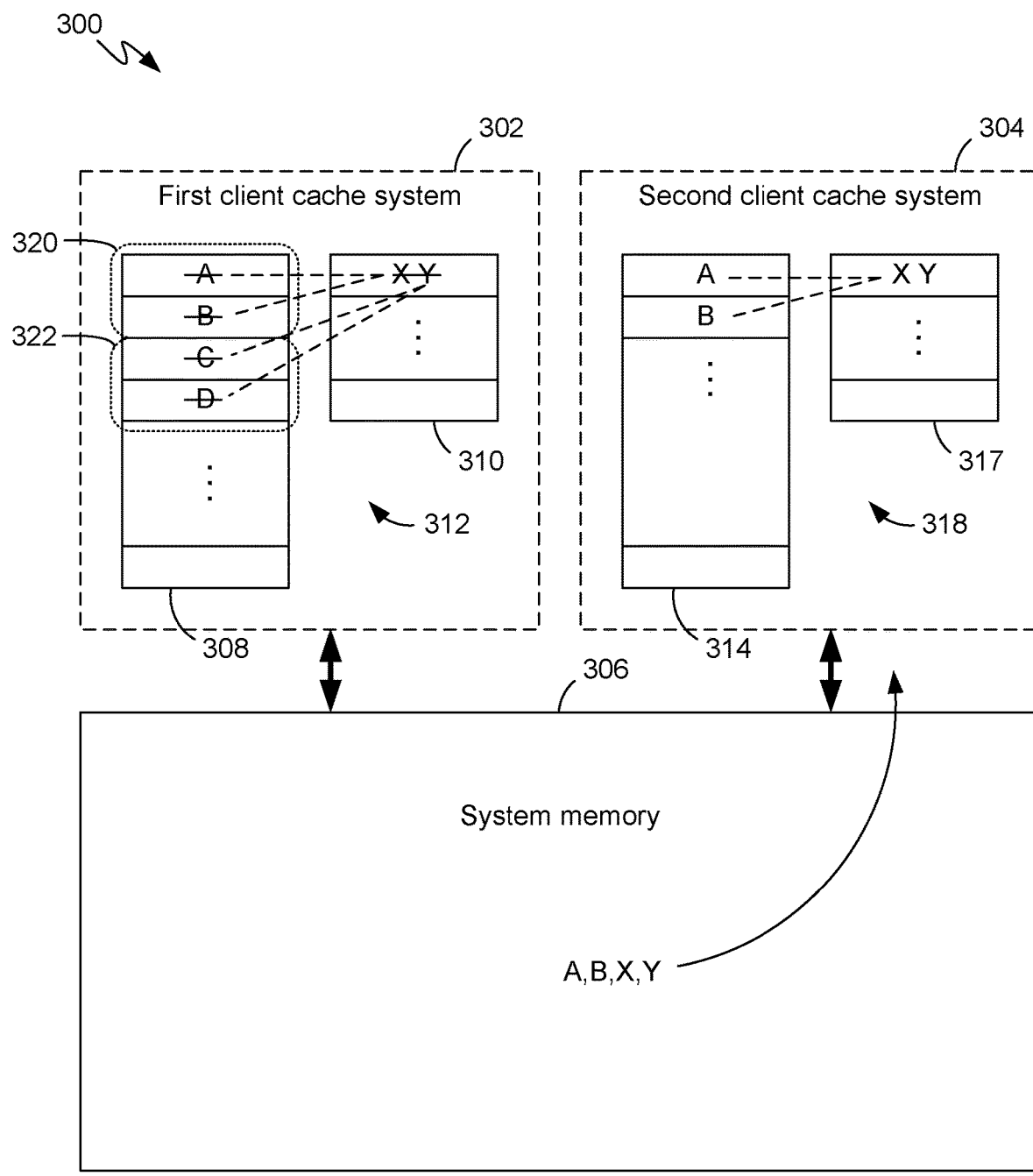
FIG. 6 is similar to FIGS. 3-5, illustrating still further actions in the example of operation of the system of FIGS. 3-5.

As shown in FIG. 6, the above-referenced read request for the data element A (including a pre-request for the metadata element X) may be completed or fulfilled by the second client cache system 302 reading from the system memory 306 at least the cache line containing the requested metadata element X and the cache lines containing data elements A and B because they are associated with metadata element X. In an alternative example (not shown), these data and metadata elements could be written directly from the first client cache system 302 to the second client cache system 304 to complete or fulfill the read request, effectively bypassing the system memory 306. It should be noted in this example (FIGS. 3-6) that fulfillment of the read request by the second client cache system 304 for the data element A is deferred until all of the metadata and data have been invalidated in the first client cache system 302 and flushed (e.g., written to the system memory 306 or the second client cache system 304).

It may also be noted in this example that not only the requested metadata element X but also all data associated with the metadata element X, namely, A and B, are returned to the second client cache system 304 in fulfillment of the request, even though the second client cache system 304 may not follow up the pre-request for metadata element X with an explicit request for the data of interest, data element A. This feature proactively returns data that the requesting client may be expected to work on based on the pre-requested metadata. In the illustrated example, it may be expected that the second client cache system 304 would follow up the pre-request for metadata element X with a request for both of the associated data elements A and B. Completing the request for a data element by anticipating a request for additional data elements associated with the same metadata element may save steps (i.e., back and forth communications) and thus speed up the second client's processing of the ROIs.

Figure 7:
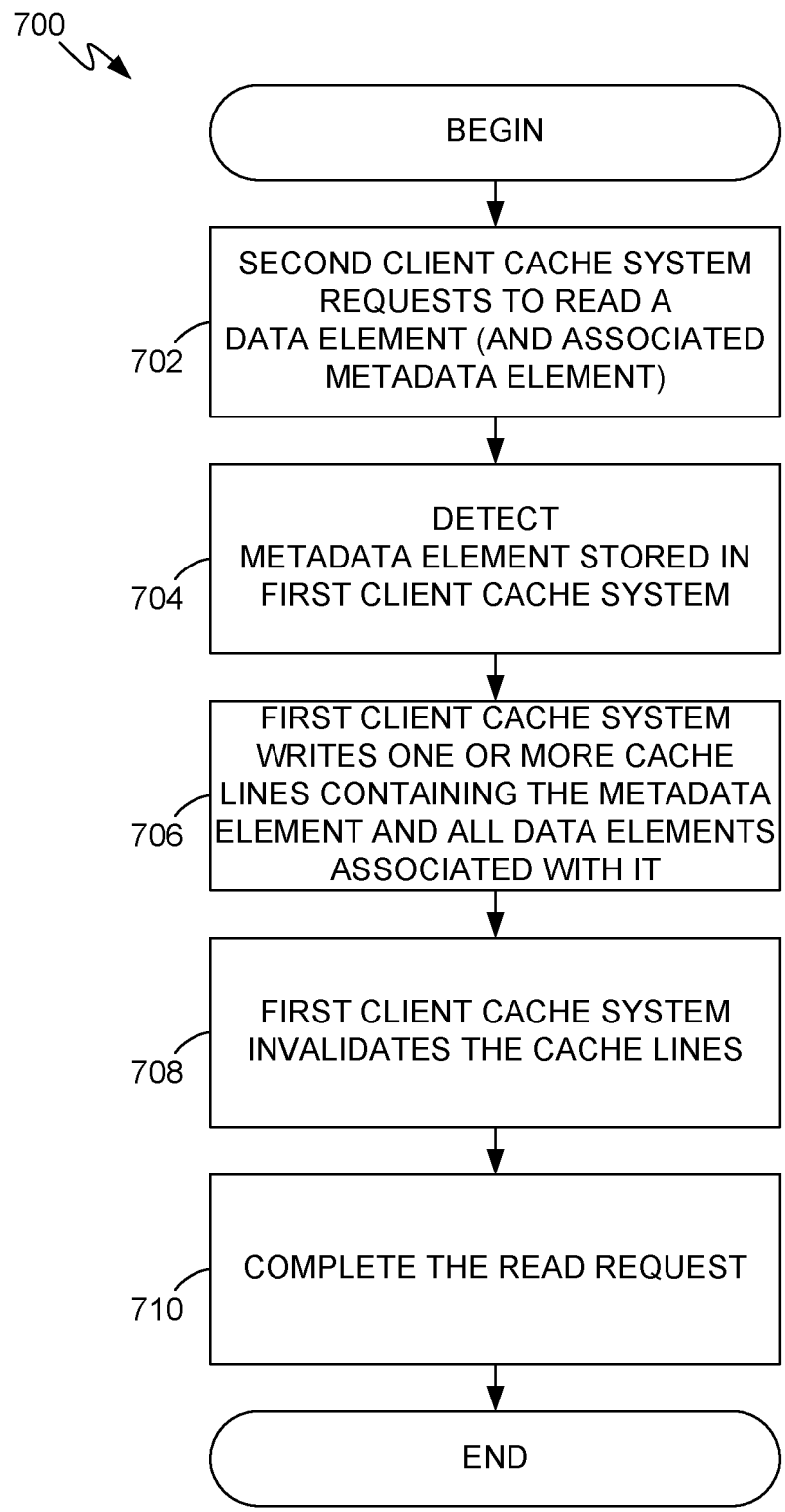
FIG. 7 is a flow diagram illustrating a method for providing cache coherency, in accordance with exemplary embodiments.

As shown in FIG. 7, a method 700 for providing cache coherency may include the following. As indicated by block 702, the method 700 may include a second client cache system requesting to read a data element that is associated with a metadata element. As indicated by block 704, the method 700 may also include detecting that the requested metadata element is stored in a first client cache system. In other words, the metadata element that the second client cache system is attempting to read is already stored in the first client cache system at the time of the request. Cache coherency or snooping techniques known to one of ordinary skill in the art may be used in this detection. This detection may occur in response to the second client cache system's read request for the metadata element.

As indicated by block 706, the method 700 may further include the first client cache system writing one or more cache lines containing the metadata element and all data elements associated with the metadata element. This write operation may occur in response to the detection of the metadata element in the first client cache system. In some examples of the method 700, the first client cache system may write these cache lines to a system memory, while in other examples the first client cache system may write these cache lines directly to the second client cache system's storage (or, conversely, the second client cache system may read these cache lines directly from the first client cache system's storage). In still other examples (not shown), the cache lines may be written to a last-level cache (i.e., a system cache shared among the clients), or any other type of shared storage. Whether the requested data and metadata elements are obtained from a system memory or directly from another client cache system may depend upon cache coherency logic implementation details, as understood by one of ordinary skill in the art. Also, in some examples, a first client may transform the data elements before the first client cache system writes the (transformed) data elements. For example, the first client may compress the data elements before writing. Note that such compression may change not only the values of the data elements but also the values of the associated metadata elements.

As indicated by the block 708, the method 700 may still further include the first client cache system invalidating the one or more cache lines. Like the write operation, this invalidation may occur in response to the detection of the metadata element in the first client cache system.

As indicated by the block 710, the method 700 may yet further include completing or fulfilling the read request. Completing the read request may comprise the second client cache system receiving the metadata element and all data elements associated with the metadata element. In an example in which the first client cache system writes the above-referenced cache lines to a system memory, the second client cache system may complete the read request by reading the cache lines from the system memory. In some examples, a second client may transform the data elements as they are received. For example, the second client may decompress the data elements using the associated metadata elements.

Figure 8:
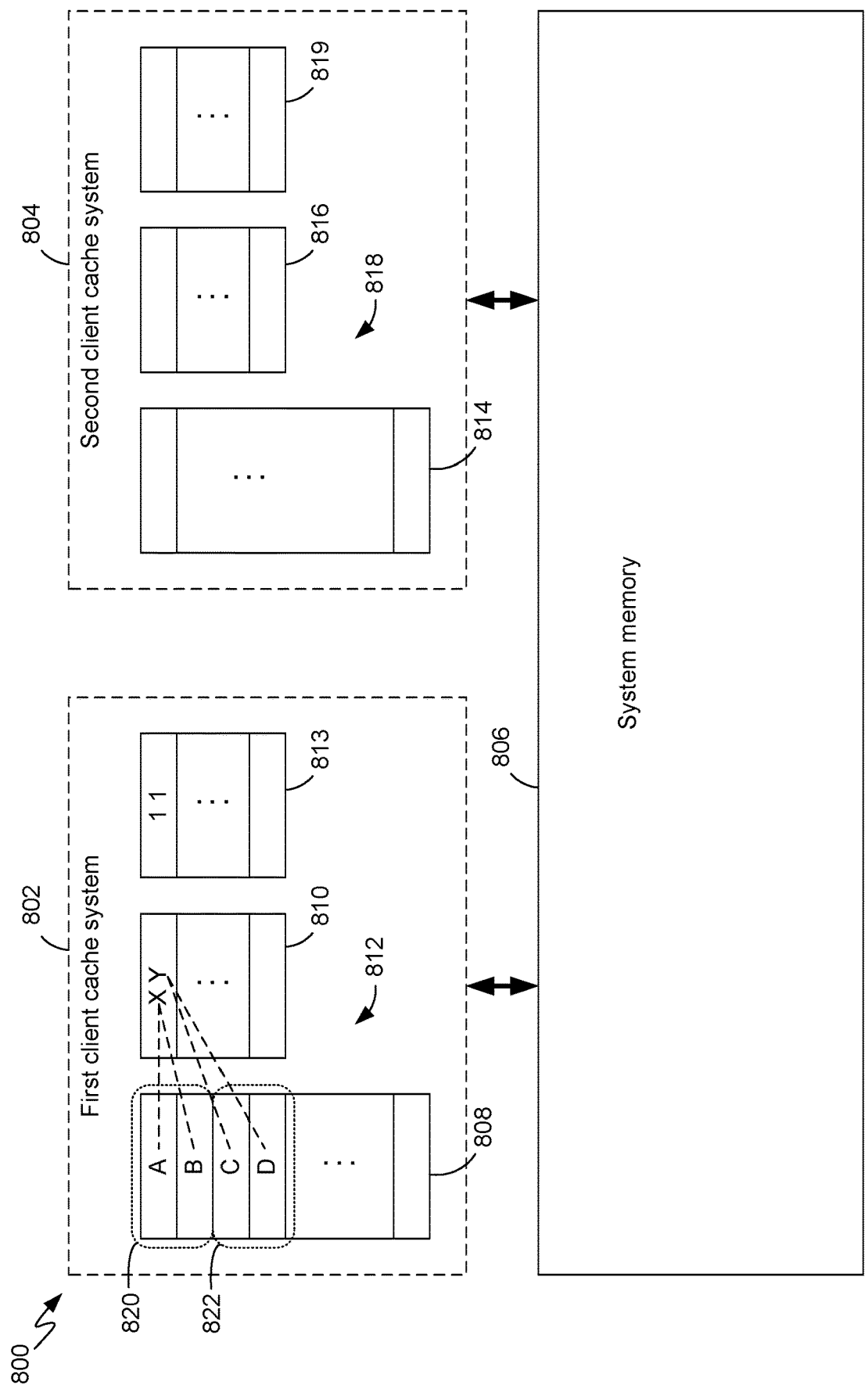
FIG. 8 is a functional block diagram illustrating another example of operation of a system for providing cache coherency, in accordance with exemplary embodiments.
Figure 9:
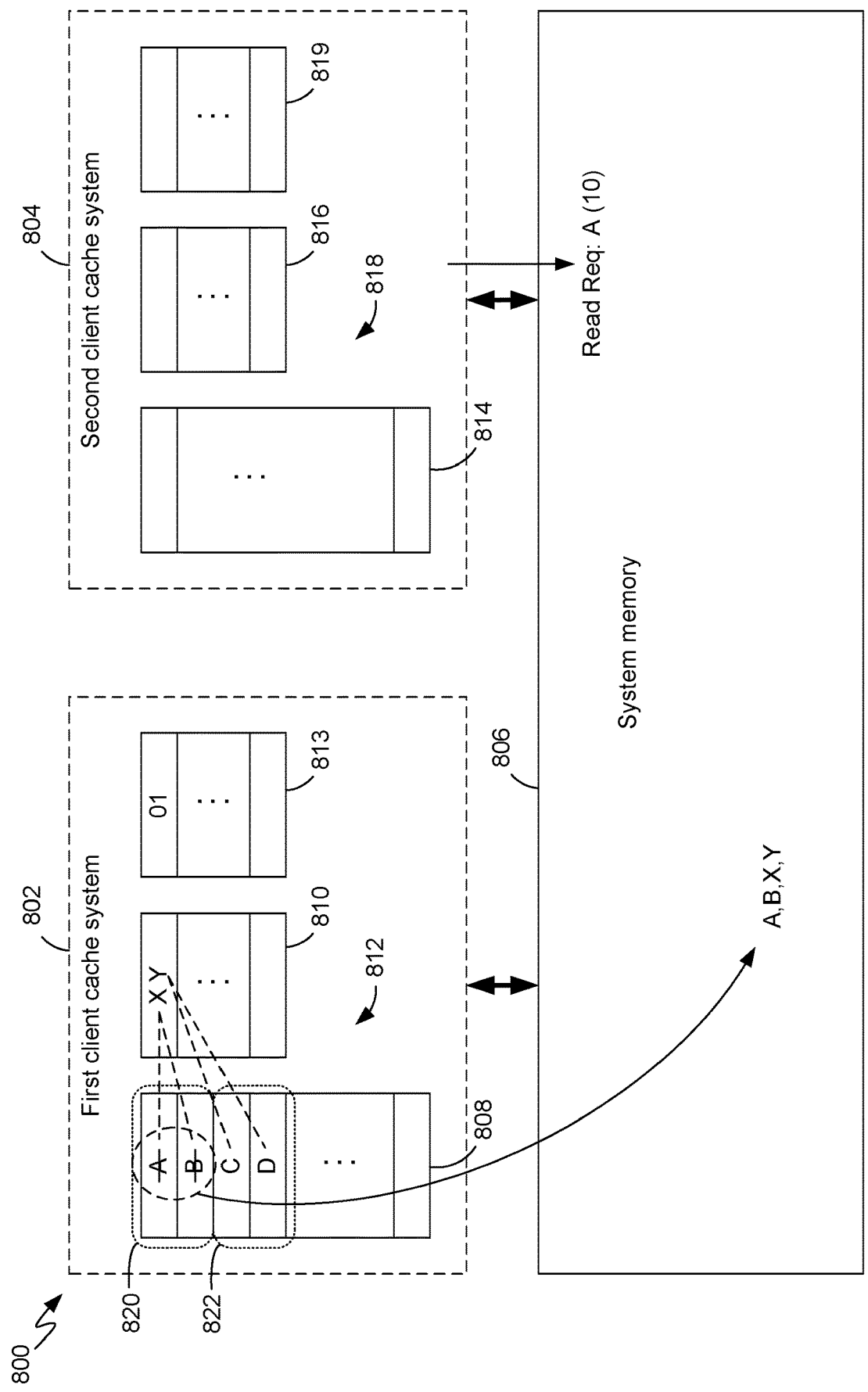
FIG. 9 is similar to FIG. 8, illustrating actions in the example of operation of the system of FIG. 8.
Figure 10:
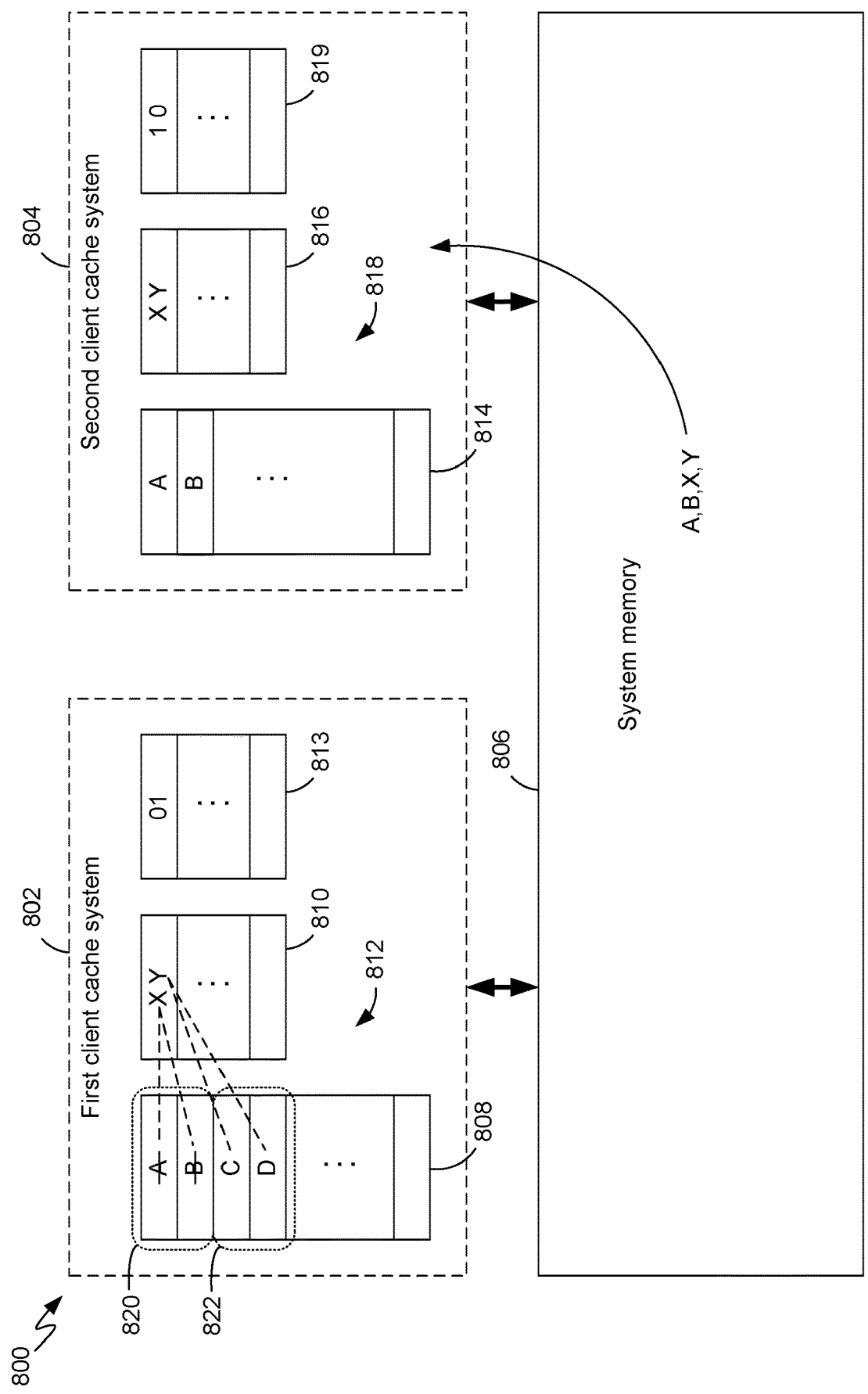
FIG. 10 is similar to FIGS. 8-9, illustrating further actions in the example of operation of the system of FIGS. 8-9.

In FIGS. 8-10, an example of operation of a system 800 similar to the above-described systems 100 (FIG. 1) and 300 (FIGS. 3-6) is illustrated. Except as may be described below, the structural aspects of the system 800 may be similar to those aspects as described above with regard to the system 300 in FIGS. 3-6. Similarly, aspects of the exemplary operation described above with regard to FIGS. 3-6 may apply to the example in FIGS. 8-10 unless otherwise indicated. For brevity, such aspects are not reiterated with regard to FIGS. 8-10. Nevertheless, it may be noted that in a first client cache system 802 a first cache storage region 812 may be configured as a data region 808 configured to store data elements in data cache lines, a metadata region 810 configured to store metadata elements in metadata cache lines, and a tag region 813 configured to store metadata state indicators corresponding to the metadata cache lines. Similarly, in a second client cache system 804 a second cache storage region 818 may be configured as a data region 814 configured to store data elements in data cache lines, a metadata region 816 configured to store metadata elements in metadata cache lines, and a tag region 819 configured to store metadata state indicators corresponding to the metadata cache lines.

As shown in FIG. 8, in an initial state of operation in this example data elements A, B, C and D and metadata elements X and Y may be stored in the first client cache system 802. In the illustrated example the metadata element X is associated with data elements A and B, which may form a tile 820. Similarly, the metadata element Y is associated with data elements C and D, which may form a tile 822. In the tag region 813 a metadata state indicator having an initial value of "11" (i.e., two bits) is stored. This metadata state indicator corresponds to the metadata cache line containing metadata elements X and Y. The positions of the bits of the metadata state indicator correspond to the positions of the metadata elements in the metadata cache line. In this example, referring to the positions of the metadata elements from left to right, metadata element X is in the first or left position, and metadata element Y is in the second or right position. Note that in other examples there may be more than two positions in a cache line. Each position in a cache line may be configured to store an amount of data, such as, for example, one byte. A "1" bit in the metadata state indicator may represent an assertion of a property referred to herein as "ownership," and a "0" bit in the metadata state indicator may represent a non-assertion of such ownership. In this example, referring to the positions of the metadata state indicator bits from left to right, the first "1" of the "11" value of the metadata state indicator indicates that the first client cache system 802 owns the metadata element X, and the second "1" of the "11" value of the metadata state indicator indicates that the first client cache system 802 also owns the metadata element Y. To "own" a metadata element means that the metadata element is not shared (e.g., with the second client cache system 804). Indicating ownership of metadata elements using corresponding bits of the metadata state indicator is intended only as an example. In other examples a metadata state indicator may encode or represent ownership of metadata elements in any other way. For example, a metadata state indicator may be encoded in the metadata element. Also, it may be noted that the metadata state indicator may be analogous to the conventional coherency state of Owned but specifically applied to metadata (as distinguished from data). Other conventional coherency states may also be applied to metadata. For example, a Shared state for metadata may be provided in association with sharing clean tiles by two or more client cache systems.

As shown in FIG. 9, a first action in this example may be that the second client cache system 804 issues a read request for data element A. The read request may include a "metadata hint," which in the illustrated example is the value "10" (i.e., two bits). The metadata hint identifies or indicates a metadata element from among two or more metadata elements in a cache line. In the illustrated example, positions of the bits of the metadata hint correspond to the positions of the metadata elements in the metadata cache line. A "1" bit in the metadata hint may represent an assertion of such an identification, and a "0" bit in the metadata hint may represent a non-assertion of such an identification. In the illustrated example, the metadata hint has a value of "10" to identify or indicate the metadata element X and not identify or indicate the metadata element Y. Identifying metadata elements using corresponding bits of the metadata hint is intended only as an example. In in other examples a metadata hint may encode or represent identifications of metadata elements in any other way. Also, in some examples (not shown) a metadata hint may identify multiple metadata elements. Similarly, a metadata hint may identify a subset of the metadata elements.

As further shown in FIG. 9, in response to the read request for data element A, including the metadata hint having a value of "10," the first client cache system 802 may, rather than invalidating the entire cache line containing metadata element X, change the values of the metadata state indicator to "01" to indicate that the first client cache system 802 no longer owns the metadata element X but continues to own the metadata element Y. This use of a metadata state indicator may, in effect, selectively invalidate some but not necessarily all metadata elements in a cache line.

Concurrently with the invalidation of one or more metadata elements, the first client cache system 802 may flush or write to the system memory 806 the cache line containing the metadata element X associated with the requested data element A and the cache lines containing data elements A and B (because they are associated with metadata element X). Note that in this example the cache lines containing data elements C and D are not flushed because they were not identified by the metadata hint. Selectively invalidating and flushing fewer than all of the associated data elements (e.g., in contrast with the example described above with regard to FIGS. 3-6) may provide a more efficient use of system memory bandwidth. Although for purposes of illustration in this example there are only two metadata elements associated with only four data elements, in an example in which the relevant metadata is associated with a much larger amount of data, flushing all the data may take a large amount of bandwidth.

As shown in FIG. 10, the read request for the data element A may be completed by, for example, the second client cache system 804 reading from the system memory 806 the cache line containing the requested metadata element X and the cache lines containing data elements A and B (because they are associated with metadata element X). The second client cache system 804 may then set the value of a metadata state indicator corresponding to the cache line containing X and Y to "10" to indicate that the second client cache system 804 now owns the metadata element X in that cache line but does not own the metadata element Y in that cache line.

Figure 11:
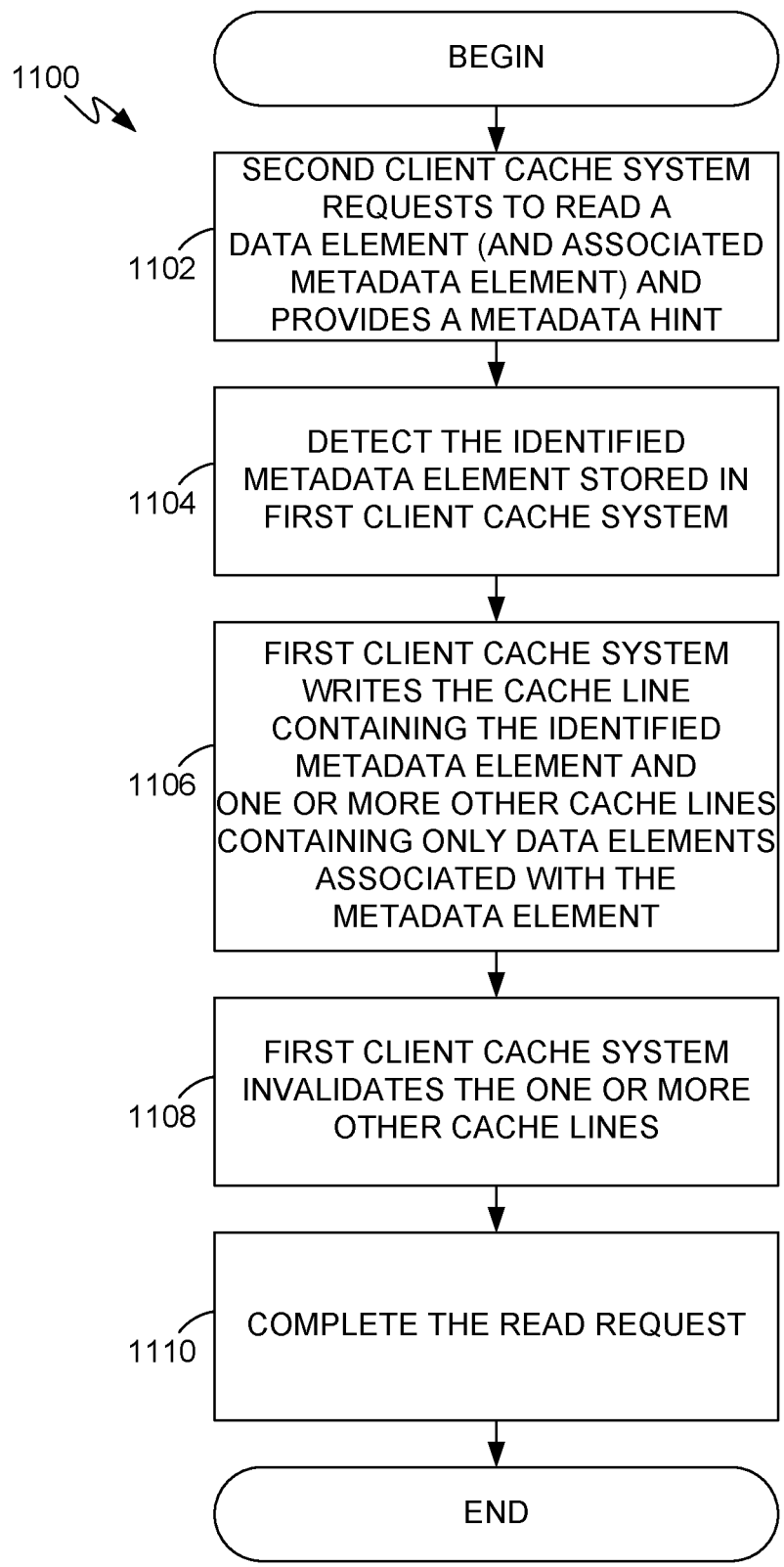
FIG. 11 is a flow diagram illustrating another method for providing cache coherency, in accordance with exemplary embodiments.

In FIG. 11, a method 1100 for providing cache coherency is illustrated. The method 1100 may be an example of the above-described method 700 (FIG. 7), in which the method 1100 includes some features in addition to and/or different from some features of the method 700. For brevity, features of the method 1100 that are similar to above-described features of the method 700 are not reiterated. The method 1100 may include the following.

As indicated by block 1102, the method 1100 may include a second client cache system requesting to read a data element associated with a metadata element. The read request may include a metadata hint identifying the metadata element from among the metadata elements in a cache line. As indicated by block 1104, the method 1100 may also include detecting that the metadata element is stored in the first client cache system. As indicated by block 1106, the method 1100 may further include the first client cache system writing the cache line containing the metadata element and writing one or more other cache lines containing only data elements associated with the metadata element identified by the metadata hint. The first client cache system may write the cache lines to, for example, a system memory.

As indicated by the block 1108, the method 1100 may still further include the first client cache system invalidating the above-referenced one or more other cache lines. As indicated by the block 1110, the method 1100 may yet further include completing the read request. Completing the read request may comprise the second client cache system receiving the cache line containing the metadata element identified by the metadata hint and one or more other cache lines containing data elements associated with that metadata element. For example, the first client cache system may read the cache lines from the system memory.

In an alternative method similar to the above-described method 1100, the metadata hint feature may be omitted, and a metadata element may instead be identified from among multiple metadata elements in the cache line based on a predetermined order or location of the metadata elements in the cache line or other criteria or rules. For example, in response to a first request from the second client cache system for a metadata cache line containing both X and Y, the first client cache system may write only the metadata element located in a first position in the cache line (e.g., X) and its associated data elements (e.g., A and B) to the system memory and not write any other metadata elements that may be contained in the cache line. Then, in response to a second request from the second client cache system for the same metadata cache line, the first client cache system may write only the metadata element in a second position in the cache line (e.g., Y) and its associated data elements (e.g., C and D) to the system memory and not write further any other metadata elements that may be contained in the cache line. In this manner, the second client cache system may continue to re-try accessing the same cache line until it receives the metadata element (and associated data elements) it is seeking. In still other methods, rules for identifying a metadata element from among multiple metadata elements in a cache line in association with a request may be based on criteria other than the order or location of the metadata elements in the cache line. For example, if a condition were to prevent the first client cache system from immediately writing X in response to a request for X, such as if A were dirty or X were pending, the first client cache system could without delay respond to a request for X by writing Y, and thereby delay the response for the requested metadata X until such time as the first client cache system may process the eviction of A or resolve the pending state of X.

Figure 12:
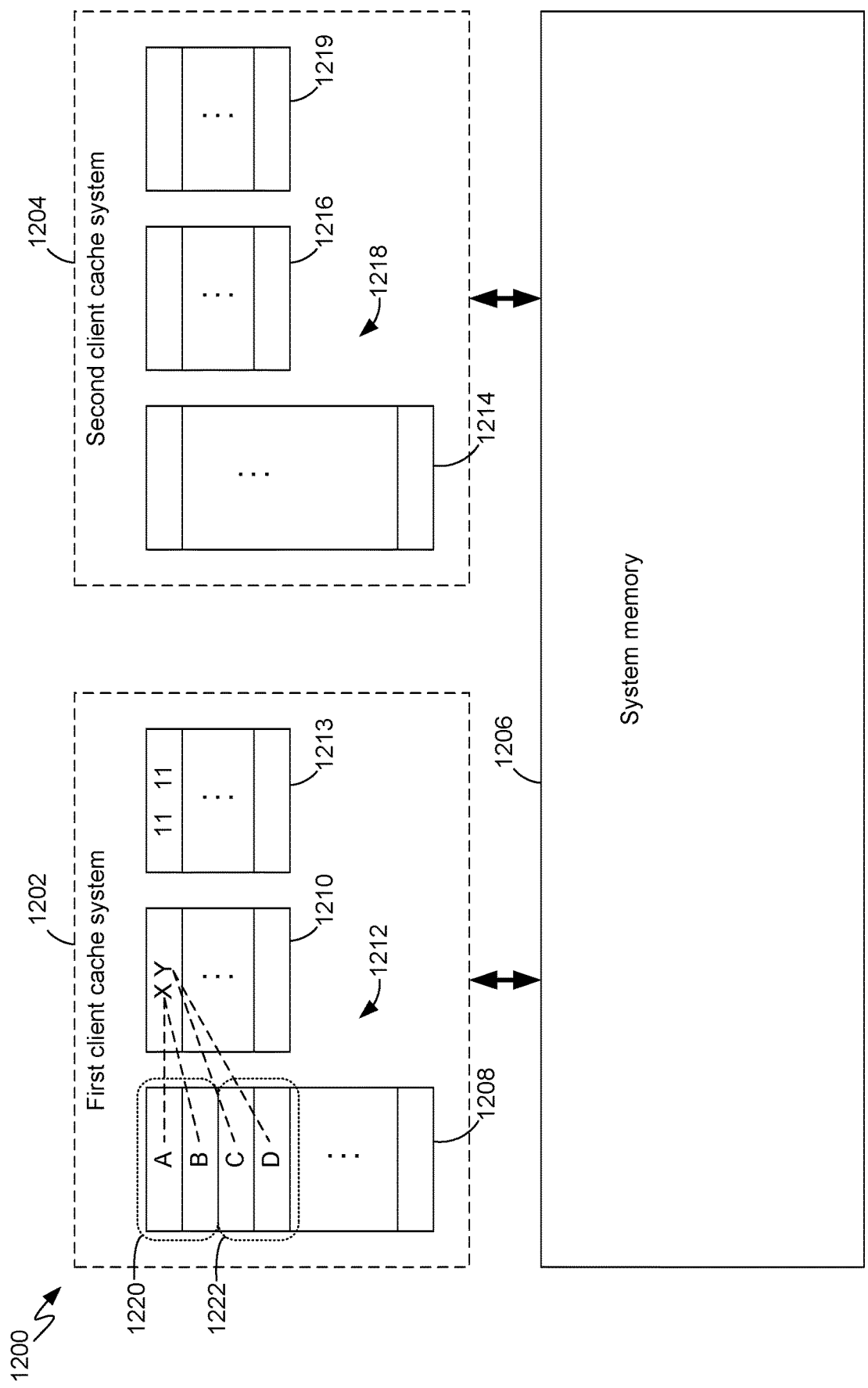
FIG. 12 is a functional block diagram illustrating another example of operation of a system for providing cache coherency, in accordance with exemplary embodiments.
Figure 13:
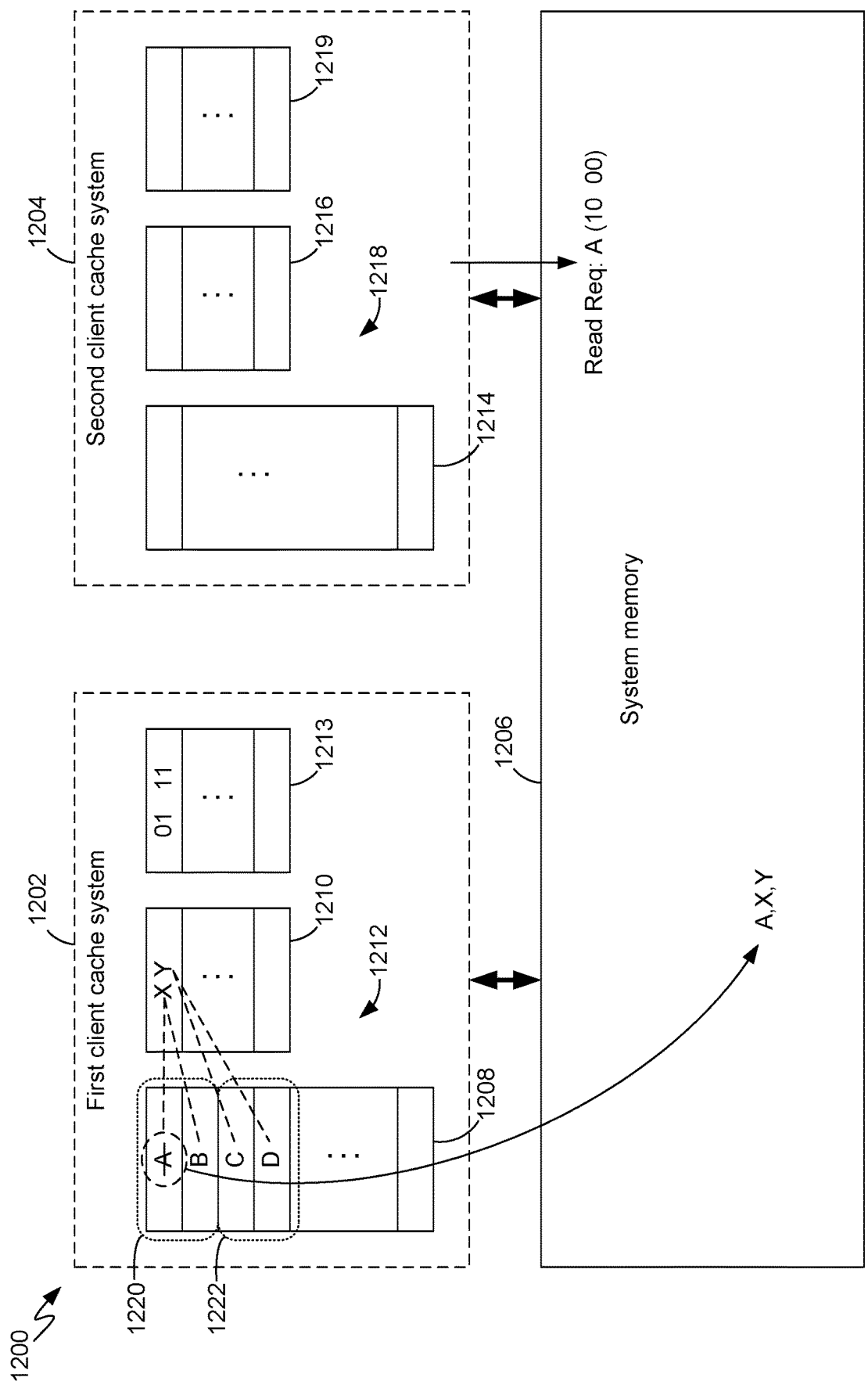
FIG. 13 is similar to FIG. 12, illustrating actions in the example of operation of the system of FIG. 8.
Figure 14:
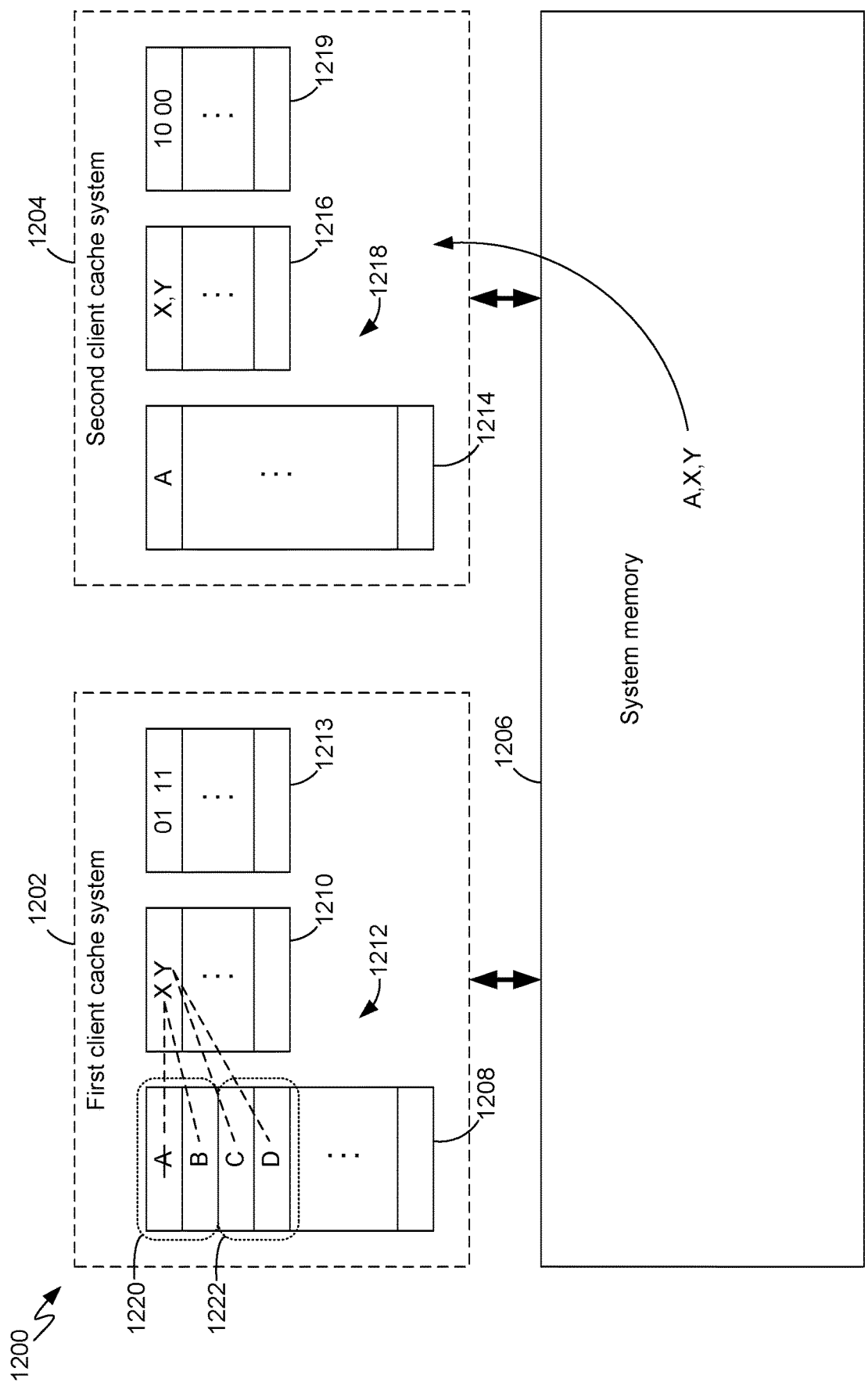
FIG. 14 is similar to FIGS. 12-13, illustrating further actions in the example of operation of the system of FIGS. 12-13.

In FIGS. 12-14, an example of operation of a system 1200 similar to the above-described systems 100 (FIG. 1), 300 (FIGS. 3-6) and 800 (FIGS. 8-10) is illustrated. Except as may be described below, the structural aspects of the system 1200 may be similar to those aspects as described above with regard to the system 100, 300 or 800. Similarly, aspects of the exemplary operation described above with regard to FIGS. 3-6 may apply to the example in FIGS. 12-14 unless otherwise indicated. For brevity, such aspects are not reiterated with regard to FIGS. 12-14. Nevertheless, it may be noted that in a first client cache system 1202 a first cache storage region 1212 may be configured as a data region 1208 configured to store data elements in data cache lines, a metadata region 1210 configured to store metadata elements in metadata cache lines, and a tag region 1213 configured to store data state indicators corresponding to the data cache lines. Similarly, in a second client cache system 1204 a second cache storage region 1218 may be configured as a data region 1214 configured to store data elements in data cache lines, a metadata region 1216 configured to store metadata elements in metadata cache lines, and a tag region 1219 configured to store data state indicators corresponding to the metadata and data cache lines.

As shown in FIG. 12, in an initial state of operation in this example data elements A, B, C and D and metadata elements X and Y may be stored in the first client cache system 1202. In the illustrated example the metadata element X is associated with data elements A and B, which may form a tile 1220. Similarly, the metadata element Y is associated with data elements C and D, which may form a tile 1222. In the tag region 1213 a data state indicator having an initial value of "11 11" (i.e., four bits) is stored. The data state indicator bits thus indicate that the first client cache system 1202 owns the four corresponding data elements A, B, C and D and their associated metadata elements. The first two data state indicator bits "11" may correspond to the data elements A and B (i.e., corresponding to the metadata element X), and the second two data state indicator bits "11" may correspond to the data elements C and D (i.e., corresponding to the metadata element Y). Indicating ownership of data elements using corresponding bits of the data state indicator is intended only as an example. In in other examples a data state indicator may encode or represent ownership of data elements in any other way. Also, note that as a data state indicator indicates owned metadata by association with the owned data, the data state indicator also serves as a metadata state indicator.

As shown in FIG. 13, a first action in this example may be that the second client cache system 1204 issues a read request for data element A. The read request may include a "data hint," which in the illustrated example is the value "10 00" (i.e., four bits). The data hint identifies or indicates one or more data elements or cache lines containing data elements. In the illustrated example, positions of the bits of the data hint correspond to the data cache lines. The "1" in the left-most bit position of the data hint "10 00" in this example may indicate that data element A alone is the hint (i.e., is requested). The "0" in each of the other three bit positions of the data hint "10 00" in this example may indicate that the hint or request does not include data elements B, C or D. Identifying data elements using corresponding bits of the data hint is intended only as an example. In in other examples a data hint may encode or represent identifications of data elements in any other way.

As further shown in FIG. 13, in response to the read request for data element A, including the data hint having a value of "10 00," the first client cache system 1202 may invalidate only the one or more cache lines containing the one or more requested data elements. Accordingly, the first client cache system 1202 may change the value of the metadata state indicator to "01 11" to indicate that the first client cache system 1202 no longer owns the data element A (and by association, no longer owns the associated metadata element X) but continues to own data elements B, C and D (and by association with data elements C and D, continues to own metadata element Y). This use of a data state indicator may, in effect, selectively invalidate some but not necessarily all data and metadata elements in a cache line.

Concurrently with the invalidation of one or more data and metadata elements, the first client cache system 1202 may flush or write to the system memory 1206 the cache line containing data element A and the cache line containing data element A's associated metadata element X. Note that in this example, none of the cache lines containing data elements B, C or D are flushed because they were not identified by the data hint. Selectively invalidating and flushing potentially still fewer data elements than in the example described above with regard to FIGS. 8-10 (i.e., still more selectively or with finer granularity) may provide an opportunity for finer-grained sharing of data, may provide a still more efficient use of system memory bandwidth, or other advantages.

As shown in FIG. 14, the read request for data element A may be completed by the second client cache system 1204 reading from the system memory 1206 the cache line containing data element A because data element A was identified by the data hint and the cache line containing metadata element X because metadata element X is associated with data element A. In this example, even though data element B is associated with metadata element X, data element B is not returned to the second client cache system 1204 because the data element B was not identified by the data hint. The second client cache system 1204 may then set the value of a data state indicator to "10 00" to indicate that the second client cache system 1204 now owns the data element A but does not own the data elements B, C or D. The data state indicator value of "10 00" also indicates that the second client cache system 1204 owns metadata element X because metadata element X is associated with owned data element A but does not own metadata element Y because metadata element Y is not associated with an owned data element.

As in other examples described above, a first client may transform data elements before the first client cache system 1202 writes the (transformed) data elements to the system memory 1206. Nevertheless, the first client may not perform such compression in this example because not all data elements of the same tile 1220 are written; only the data element A is written, and the data element B, which is part of the same tile 1220, is not written. In an alternative example, the first client may perform such compression (using the data elements A and B, or A alone), and the second client cache system 1204 may read only the (compressed) data element A from the system memory 1206 and not read the (compressed) data element B if present. Still other solutions are described below with regard to FIG. 25.

Figure 15:
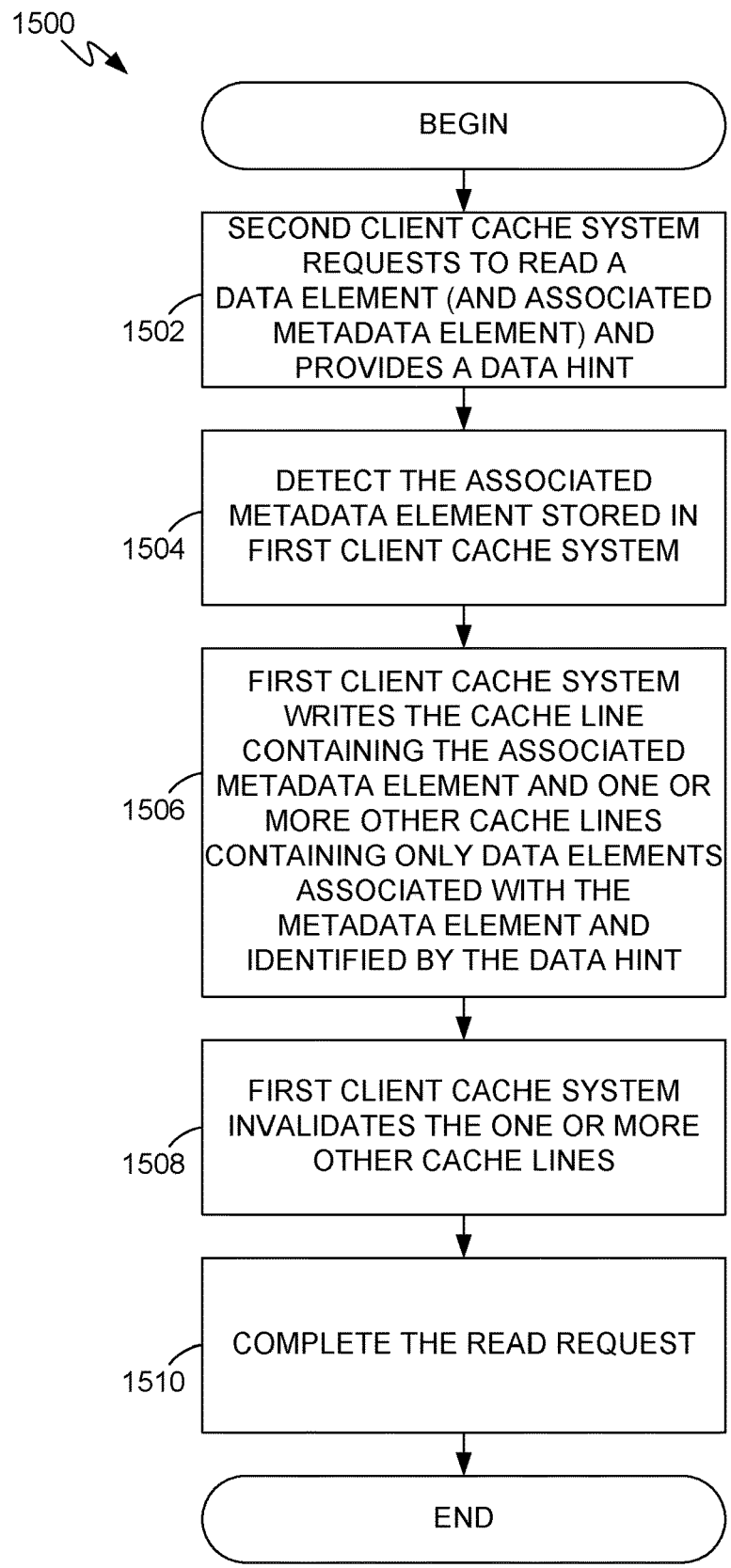
FIG. 15 is a flow diagram illustrating still another method for providing cache coherency, in accordance with exemplary embodiments.

In FIG. 15, a method 1500 for providing cache coherency is illustrated. The method 1500 may be an example of the above-described method 1100 (FIG. 11), in which the method 1500 includes some features in addition to and/or different from some features of the method 1100. For brevity, features of the method 1500 that are similar to above-described features of the method 1100 are not reiterated. The method 1500 may include the following.

As indicated by block 1502, the method 1500 may include a second client cache system requesting to read a data element associated with a metadata element. The read request may include a data hint identifying a data element or cache line containing the data element. As each data element has an associated metadata element, the data hint thus also identifies an associated metadata element.

As indicated by block 1504, the method 1500 may also include detecting that the data element indicated by the data hint is stored in the first client cache system. As indicated by block 1506, the method 1100 may further include the first client cache system writing the cache line containing the associated metadata element and writing one or more other cache lines containing only the one or more data elements identified by the data hint. The first client cache system may write the cache lines to, for example, a system memory.

As indicated by the block 1508, the method 1500 may still further include the first client cache system invalidating the above-referenced one or more other cache lines. As indicated by the block 1510, the method 1500 may yet further include completing the read request. Completing the read request may comprise the second client cache system receiving the cache line containing the metadata element and one or more other cache lines containing only the data elements associated with the metadata element that are identified by the data hint. For example, the first client cache system may read the cache lines from the system memory.

In FIGS. 16-23, an example of operation of a system 1200 similar to the above-described systems 100 (FIG. 1), 300 (FIGS. 3-6), 800 (FIGS. 8-10) and 1200 (FIGS. 12-14) is illustrated. Except as may be described below, the structural aspects of the system 1600 may be similar to those aspects as described above with regard to the systems 100, 300, 800 or 1200. Similarly, aspects of the exemplary operation described above with regard to FIGS. 3-6 may apply to the example in FIGS. 16-23 unless otherwise indicated. For brevity, such aspects are not reiterated with regard to FIGS. 16-23. Nevertheless, it may be noted that in a first client cache system 1602 a first cache storage region 1612 may be configured as a data region 1608 configured to store data elements in data cache lines, and a metadata region 1610 configured to store metadata elements in metadata cache lines. Similarly, in a second client cache system 1604 a second cache storage region 1618 may be configured as a data region 1614 configured to store data elements in data cache lines, and a metadata region 1616 configured to store metadata elements in metadata cache lines. As in the examples described above, the premise of this example is that a second client is attempting to work on the same region of interest (e.g., data element A) that a first client is working on. As noted above, first and second clients are not shown in the examples for purposes of clarity but may control their respective cache systems in the manner described above with regard to FIG. 3.

Figure 16:
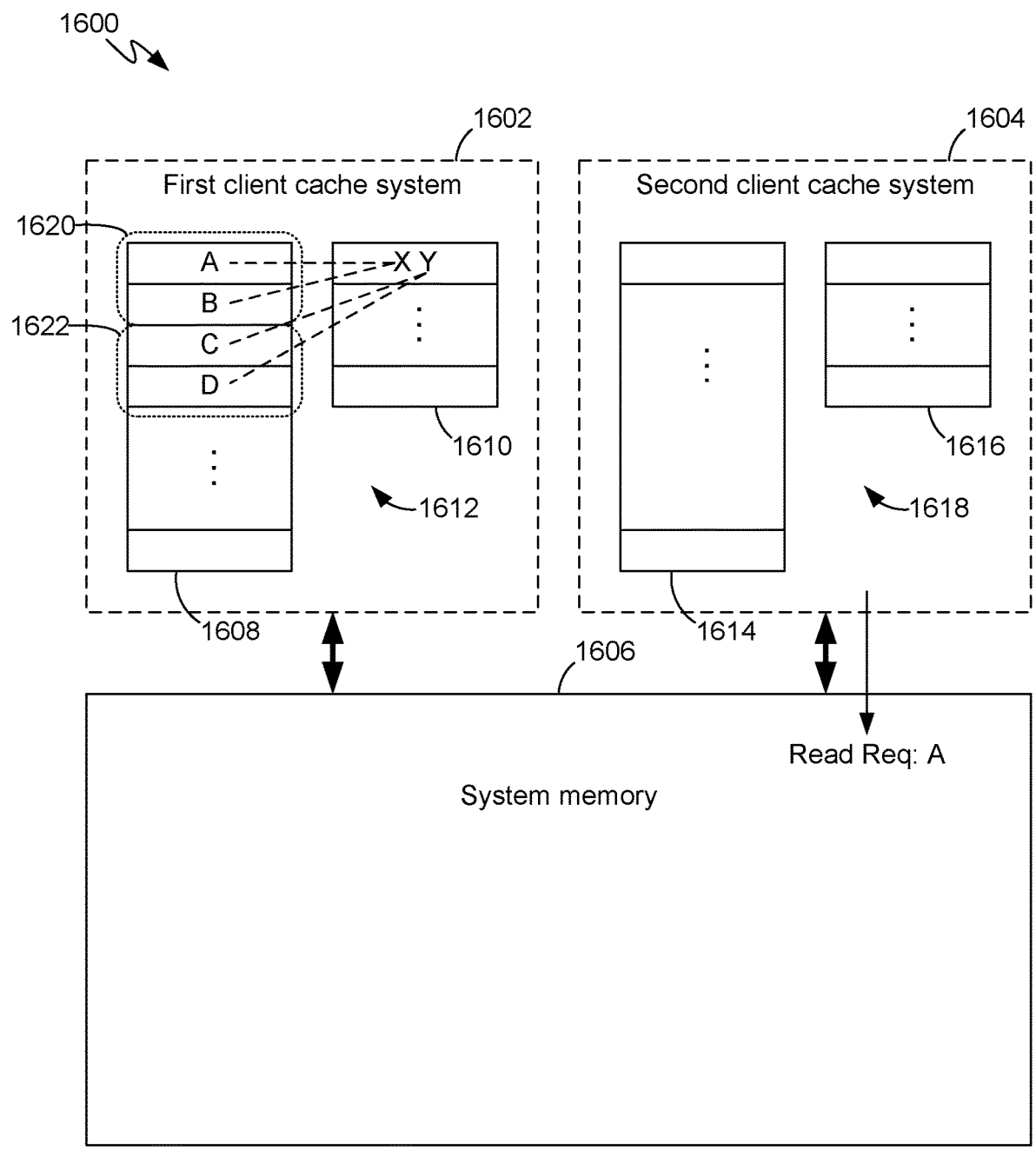
FIG. 16 is a functional block diagram illustrating still another example of operation of a system for providing cache coherency, in accordance with exemplary embodiments.

As shown in FIG. 16, in an initial state of operation in this example data elements A, B, C and D and metadata elements X and Y may be stored in the first client cache system 1602. In the illustrated example the metadata element X is associated with data elements A and B, which may form a tile 1620. Similarly, the metadata element Y is associated with data elements C and D, which may form a tile 1622. A first action in this example may be that the second client cache system 1604 issues a read request for data element A. Although not shown for purposes of clarity, the read request for the data element A may include a pre-request for the associated metadata element X (or for the cache line containing the metadata element X). In this example (FIGS. 16-23), a first client (not shown) may not be done working on the tile 1620 at the time the second client cache system 1604 requests data element A. If the first client cache system 1602 were done working on the tile 1620 at the time the second client cache system 1604 requests data element A, then the first client cache system 1602 could respond by immediately invalidating and flushing the related cache lines to the system memory 1606, and the read request for A could then be completed, as described above with regard to FIGS. 3-6. In this example, however, the first client cache system 1602 may not be done working on the tile 1620 at the time of the read request for data element A and therefore does not yet invalidate and flush the cache lines.

Figure 17:
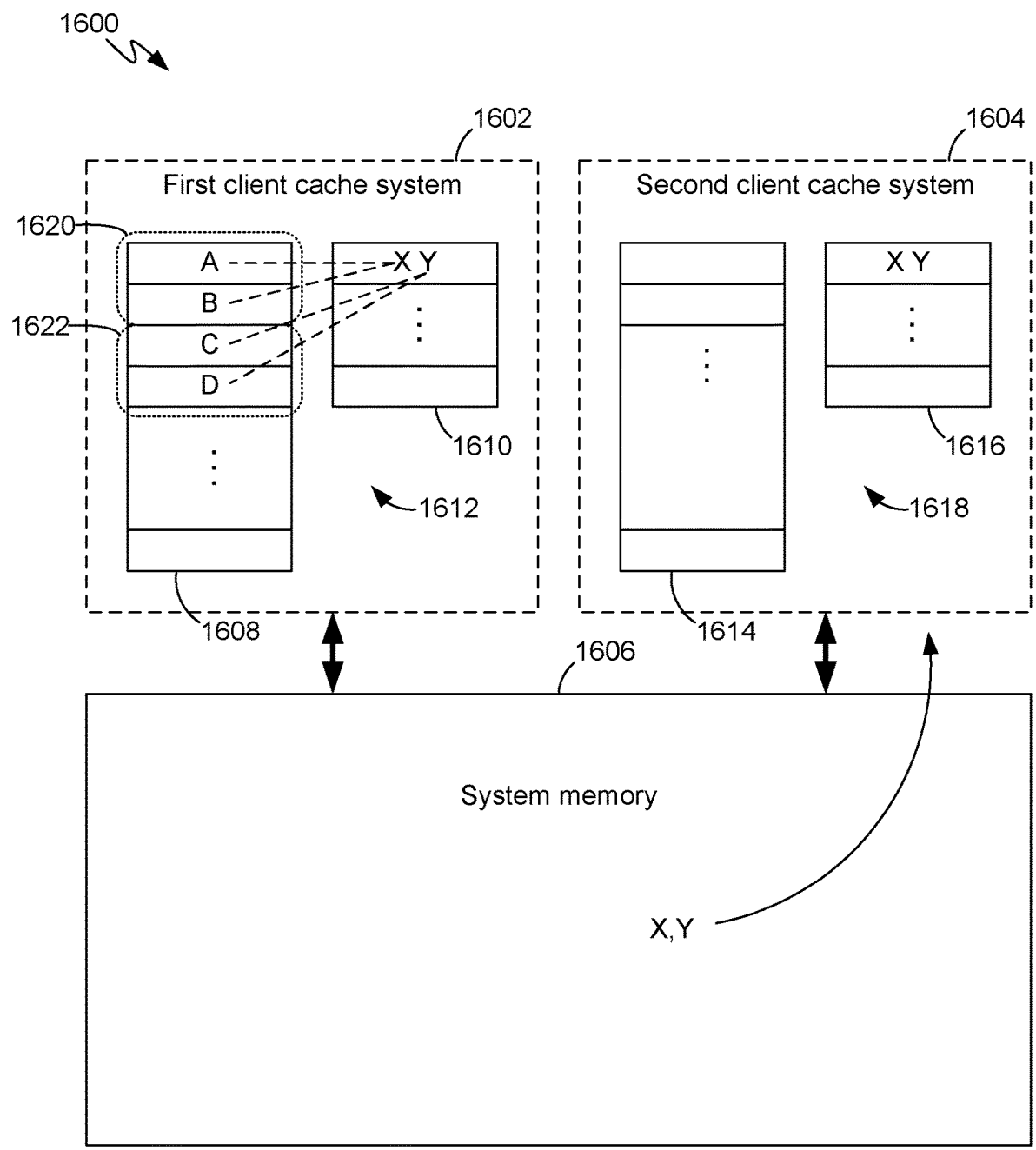
FIG. 17 is similar to FIG. 16, illustrating actions in the example of operation of the system of FIG. 16.

As shown in FIG. 17, in response to the read request for data element A (which may include a pre-request for the associated metadata element X), the cache line containing metadata element X (which also contains metadata element Y) may be returned to the second client cache system 1604. Whether the requested metadata element is read from the system memory 1606 as in the example shown in FIG. 17 or directly from the first client cache system 1602 may depend upon cache coherency logic implementation details, as understood by one of ordinary skill in the art.

Figure 18:
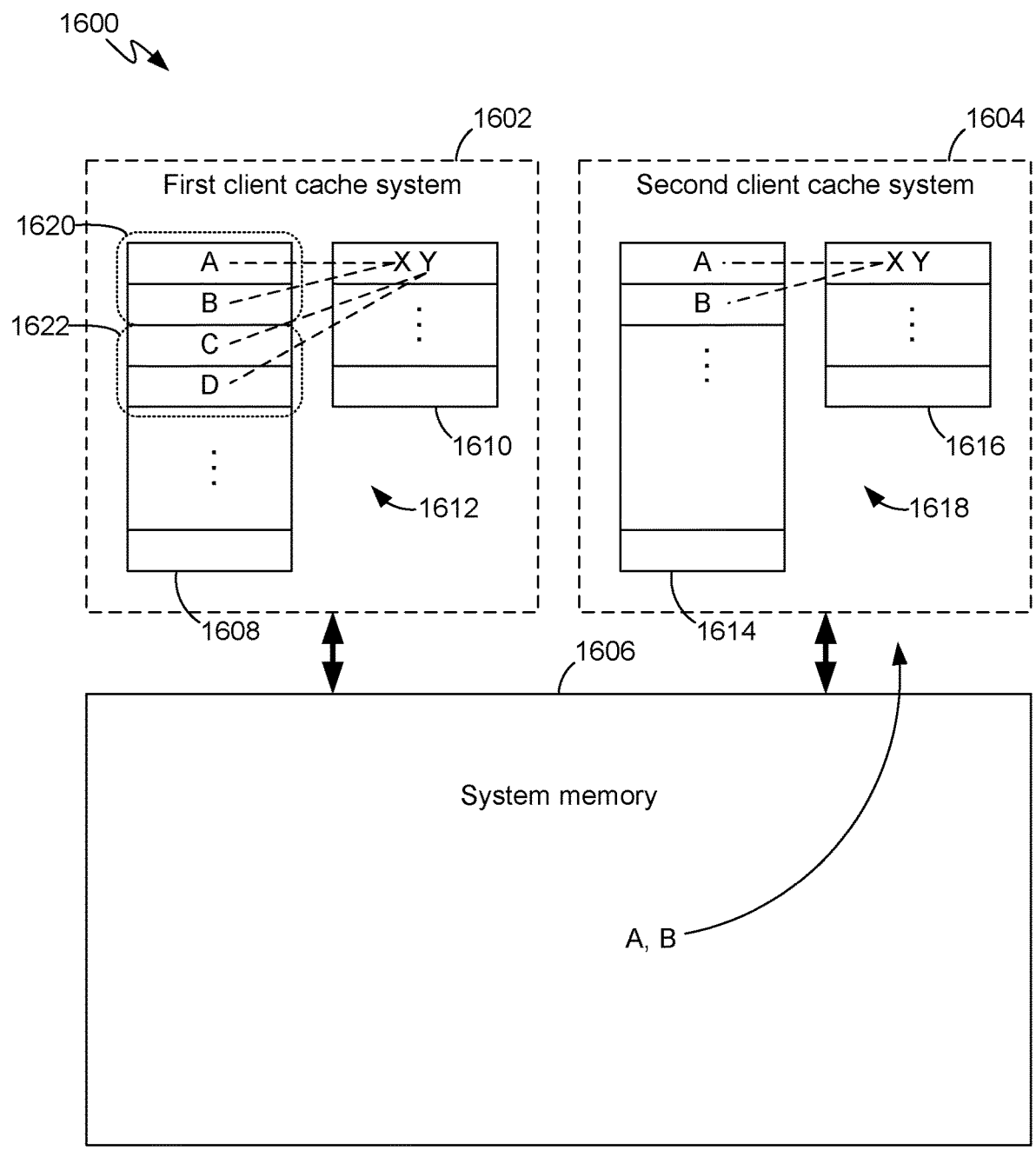
FIG. 18 is similar to FIGS. 16-17, illustrating further actions in the example of operation of the system of FIGS. 16-17.

As shown in FIG. 18, also in response to the read request for data element A, the cache line containing data element A may be returned to the second client cache system 1604. Whether the requested data element is read from the system memory 1606 as in the example shown in FIG. 18 or directly from the first client cache system 1602 into the second client cache system 1604 may depend upon cache coherency logic implementation details, as understood by one of ordinary skill in the art. Also, in an example in which the requested data element is read from the system memory 1606, not only the data element A but also all other data elements of the same tile 1620 may be read and thus returned to the second client cache system 1604. Accordingly, as shown in FIG. 18, the cache line containing data elements A and B may be returned to the second client cache system 1604. Further, as described above with regard to FIGS. 3-6, in still other examples the data elements C and D may also be (proactively) provided to the second client cache system 1604.

Figure 19:
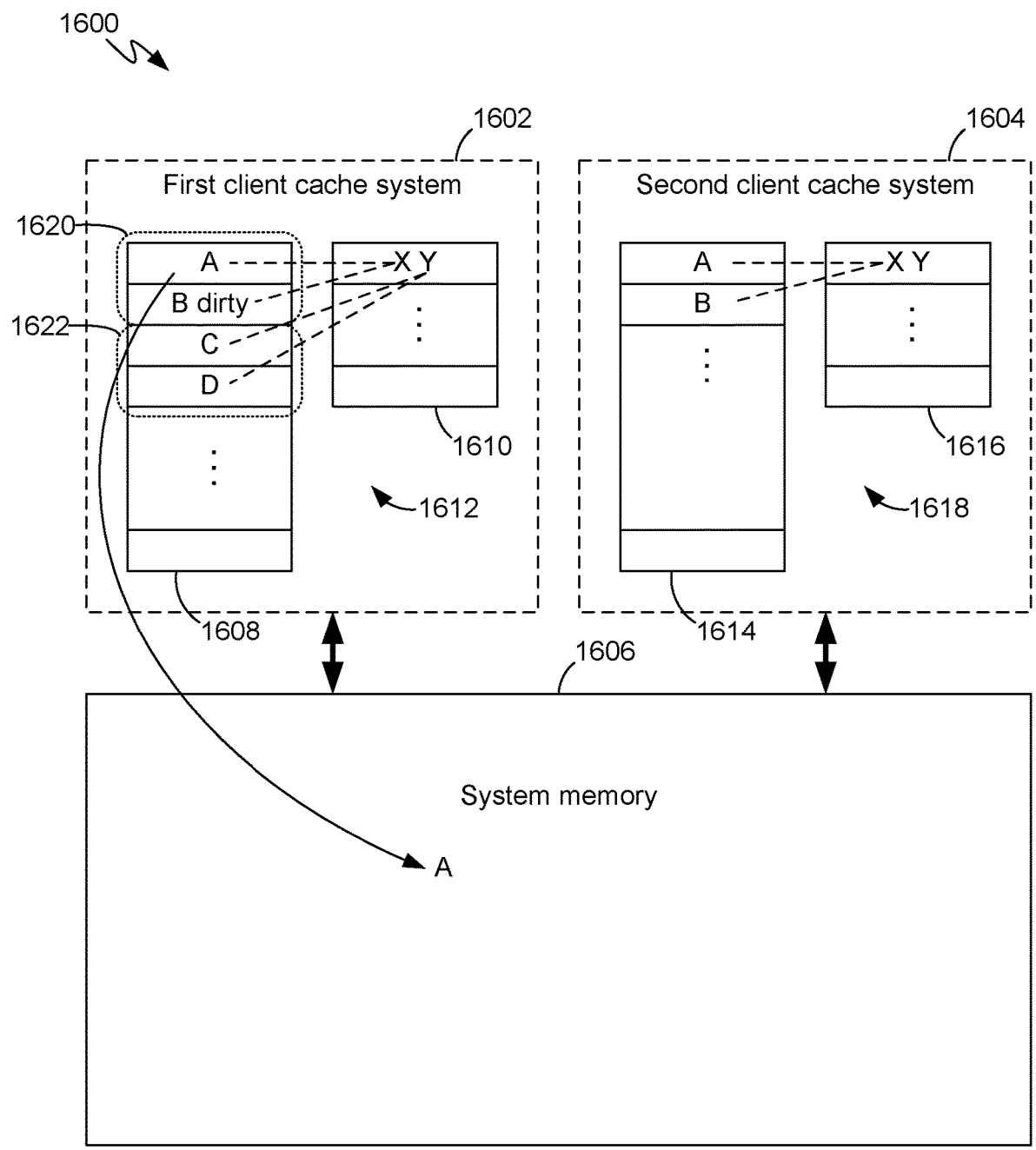
FIG. 19 is similar to FIGS. 16-18, illustrating further actions in the example of operation of the system of FIGS. 16-18.

As shown in FIG. 19, the data element A may be written from the first client cache system 1602 to the system memory 1606 in the course of the first client (not shown) continuing to work on, i.e., process, the tile 1620. For example, the first client may compress the data element A from the first client cache system 1602 and write the compressed data element A to the system memory 1606. The compression may generate an updated value of metadata element X along with the compressed data element A, and the value of metadata element X may be updated in the first client cache system 1602. In the example shown in FIG. 19, the data element B of the tile 1620 may have a "dirty" state because the first client may still be working on the tile 1620, and the data element B has not yet been written to the system memory 1606. The first client may, for example, have compressed data element B but not yet written the compressed data element B to the system memory 1606.

Figure 20:
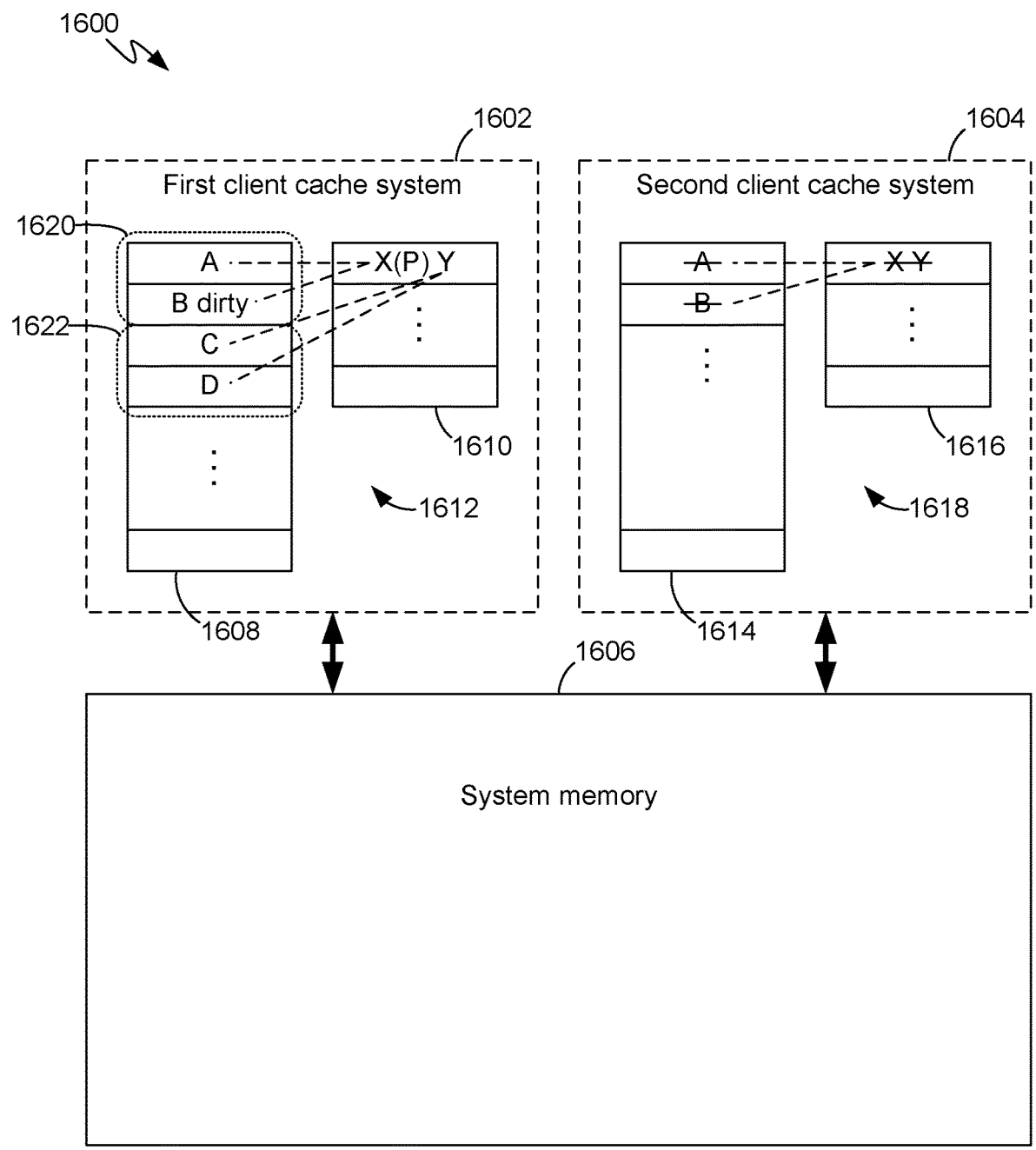
FIG. 20 is similar to FIGS. 16-19, illustrating further actions in the example of operation of the system of FIGS. 16-19.

As shown in FIG. 20, concurrently with writing data element A to the system memory 1606, updating the state of data element B to dirty, and updating the value of metadata X, the first client cache system may tag metadata element X with an indication of a state referred to herein as "pending" ("P"). The term "pending" is used herein for convenience, and the use of this term should not in itself be construed as limiting. The P tag or state is detectable by snooping and indicates to a snooping entity, such as another cache system, that the cache system is not done working on the data elements associated with the P-tagged metadata element. Accordingly, in the illustrated example (FIGS. 16-23) the second client cache system 1604 may detect the bus transaction relating to the first client cache system 1602 writing the data element A and further detect that the metadata element X that is shared between the first client cache system 1602 and the second client cache system 1604 is tagged with a P state. In response to detecting that the shared metadata element X has a P state, the second client cache system 1604 may invalidate the cache line containing the shared metadata element X and all cache lines containing data elements associated with the invalidated metadata elements.

In the illustrated example, the P state of a shared metadata element indicates to the second client cache system 1604 that it must invalidate its copies of these data and metadata cache lines and defer working on the region of interest (e.g., data element A) until the first client cache system 1602 has invalidated and written all of the cache lines containing the shared metadata and associated data elements to the system memory 1606. Note that this invalidation and writing of cache lines containing shared metadata and associated data elements may be similar to the invalidation and writing described above with regard to FIGS. 3-7 except that the invalidation and writing is deferred until the first client is done working on the region of interest.

Figure 21:
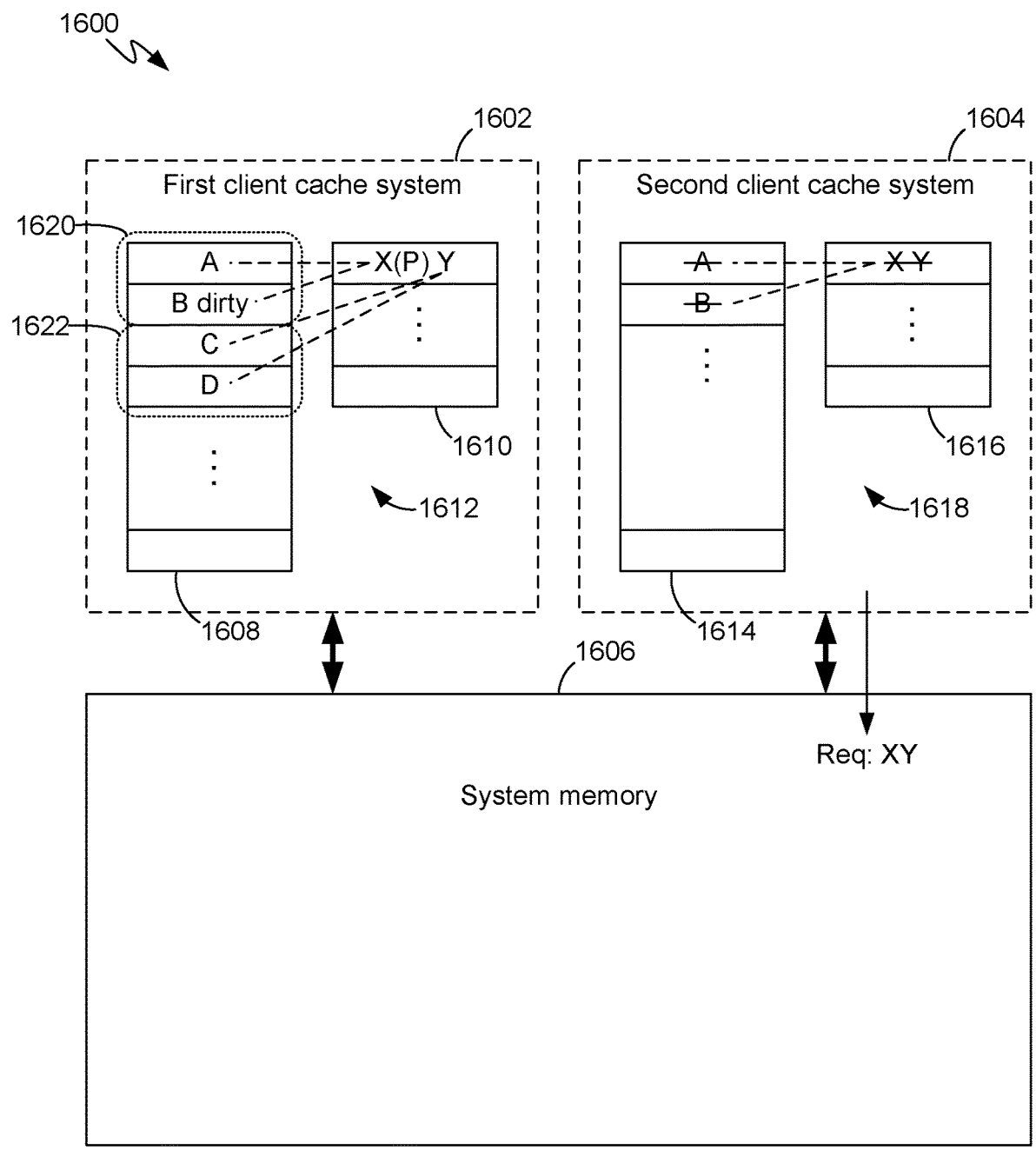
FIG. 21 is similar to FIGS. 16-20, illustrating further actions in the example of operation of the system of FIGS. 16-20.

As shown in FIG. 21, the second client cache system 1604 may again issue a read request for data element A (which may again include a pre-request for metadata element X) because the second client cache system 1604 continues to attempt to work on that region of interest. Nevertheless, this read request will not be completed, i.e., it will remain pending, until such time as the first client cache system 1602 invalidates and writes the cache lines relating to the P-tagged metadata element.

Figure 22:
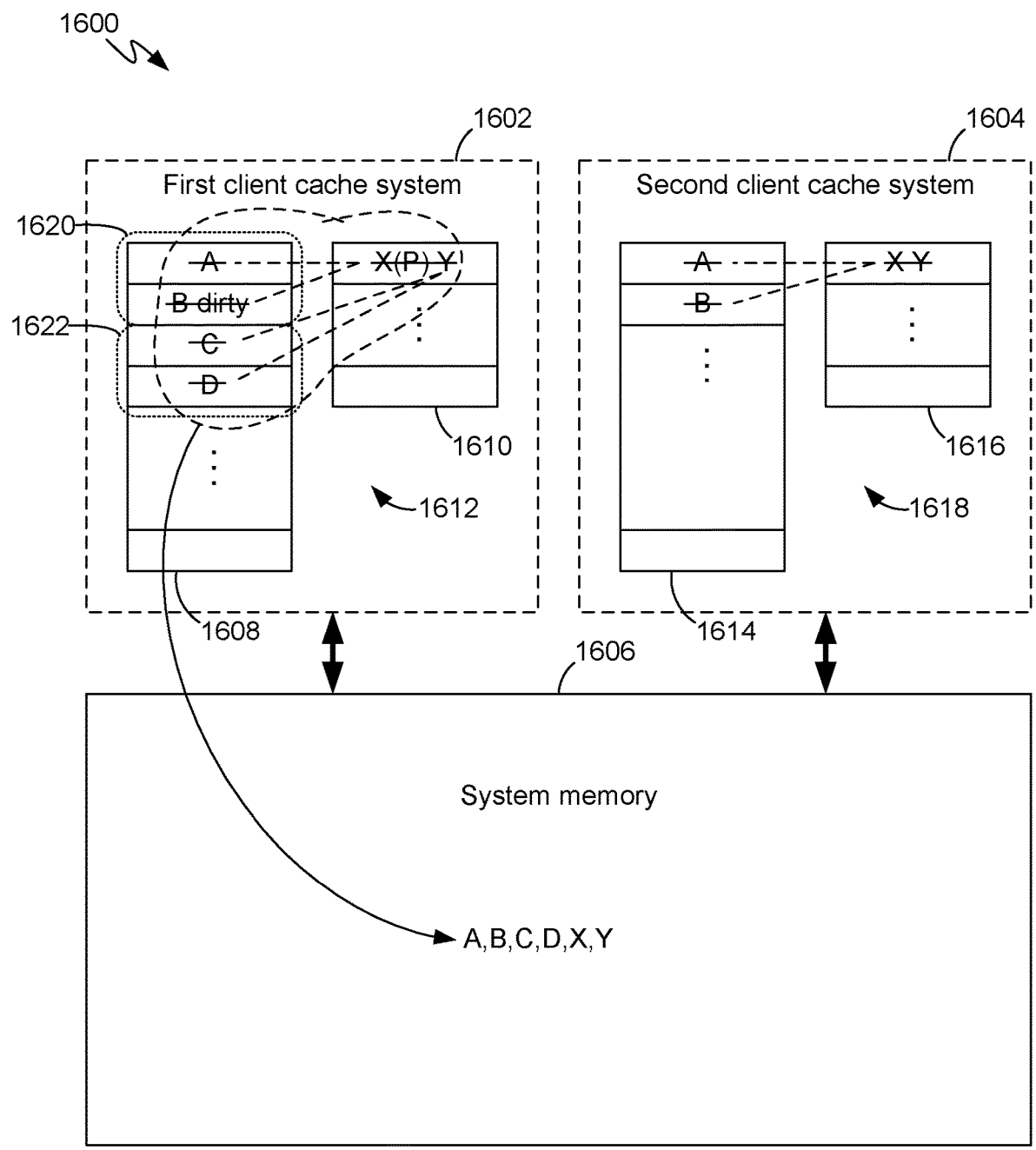
FIG. 22 is similar to FIGS. 16-21, illustrating further actions in the example of operation of the system of FIGS. 16-21.
Figure 23:
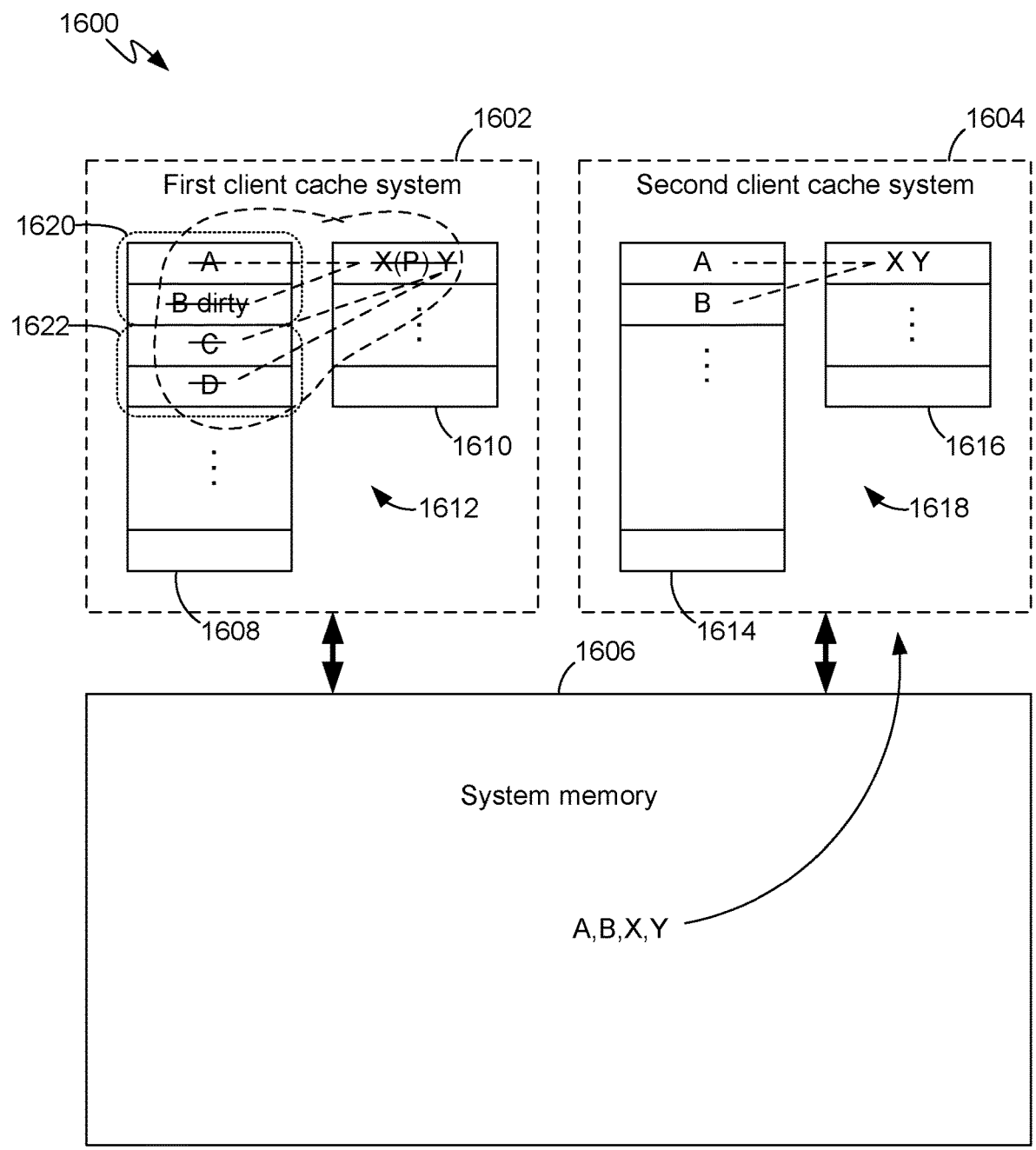
FIG. 23 is similar to FIGS. 16-22, illustrating further actions in the example of operation of the system of FIGS. 16-22.

As shown in FIG. 22, the first client cache system 1602 may invalidate and write the above-referenced cache lines containing data elements A, B, C and D and metadata elements X and Y, which may occur when the first client is done working on those data elements. Then, in response to, or triggered by, this writing or flushing of the above-referenced cache lines to the system memory 1606, the read request for the data element A may be completed or fulfilled, as shown in FIG. 23. For example, the second client cache system 1604 may read or otherwise obtain the data element A and associated metadata element X from the system memory 1604. The cache line provided to the second client cache system 1604 may contain the metadata element Y along with the metadata element X. Also, as described above with regard to other examples, the data element B may be provided proactively to the second client cache system 1604.

Figure 24:
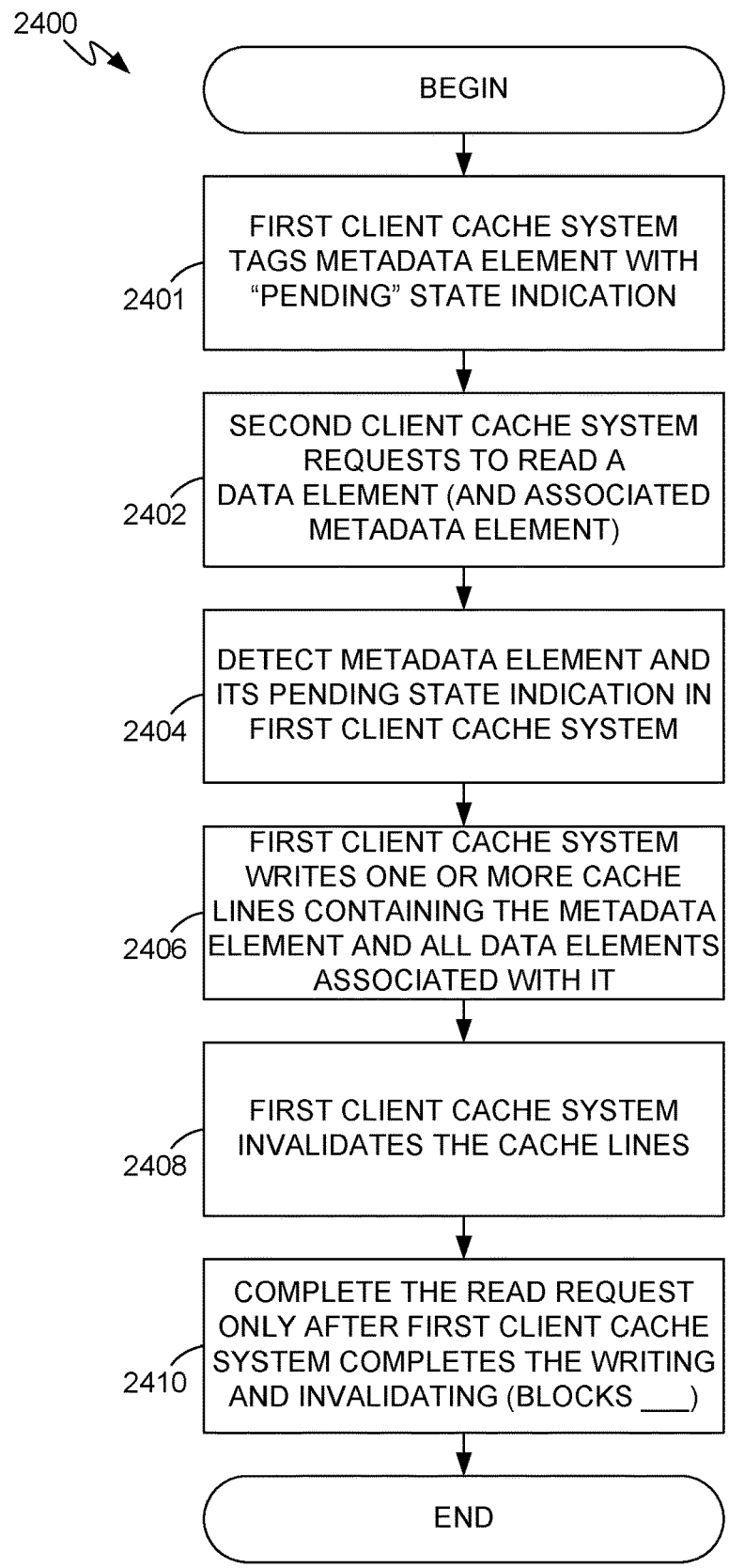
FIG. 24 is a flow diagram illustrating yet another method for providing cache coherency, in accordance with exemplary embodiments.

In FIG. 24, a method 2400 for providing cache coherency is illustrated. The method 2400 may be an example of the above-described method 700 (FIG. 7), in which the method 2400 includes some features in addition to and/or different from some features of the method 700. The method 2400 may include the following.

As indicated by block 2401, the method 2400 may include a first client cache system tagging a stored metadata element with a tag or indication that indicates a "pending" or "P" state. That is, the first client cache system may store a pending state indication in association with the stored metadata element. The first client cache system may tag the stored metadata element with the P state concurrently with writing an associated data element (e.g., to a system memory), as in the above-described (FIG. 20) example, or at another (e.g., later) time, such as in response to a read request (FIG. 21) for the data element. As indicated by block 2402, the method 700 may further include a second client cache system requesting to read the data element and associated metadata element. As indicated by block 2404, the method 2400 may include detecting that the metadata element is stored in the first client cache system and has the pending state tag or indication.

As indicated by block 2406, the method 700 may further include the first client cache system writing one or more cache lines containing the metadata element and all data elements associated with the metadata element. This write operation may occur in response to the detection of the metadata element in the first client cache system. In some examples of the method 2400, the first client cache system may write these cache lines to a system memory, while in other examples the first client cache system may write these cache lines directly to the second client cache system's storage (or, conversely, the second client cache system may read these cache lines directly from the first client cache system's storage). Also, in some examples, a first client may transform (e.g., compress) the data elements before the first client cache system writes the data elements.

As indicated by the block 2408, the method 2400 may still further include the first client cache system invalidating the one or more cache lines. As indicated by the block 2410, the method 2400 may yet further include completing the read request. Nevertheless, as indicated by block 2410, completing the read request is deferred or does not occur until after the above-referenced writing and invalidating operations (blocks 2406-2408). It should be understood that the order in which the blocks 2401-2410 are depicted in FIG. 24 is intended to help guide the reader through an example and is not intended to limit the order in which various actions may occur in other examples of the method 2400. The same understanding applies to the order in which blocks of the other methods 700 (FIG. 7), 1100 (FIG. 11) and 1500 (FIG. 15) are depicted.

As in other methods described above, completing the read request (block 2410) may comprise the second client cache system receiving the metadata element and all data elements associated with the metadata element. For example, the first client cache system may read the cache lines from the system memory.

In some embodiments of a method for providing cache coherency, features of some of the exemplary methods 700, 1100, 1500 and 2400 may be provided in combination with features of others of the methods 700, 1100, 1500 and 2400. For example, features of the method 2400 relating to the pending state indication may be included in any of the methods 700, 1100 and 1500. Correspondingly, in some embodiments of a system for providing cache coherency, some of the exemplary systems 300, 800, 1200 and 1600 may be configured to include features of others of the systems 300, 800, 1200 and 1600.

Figure 25:
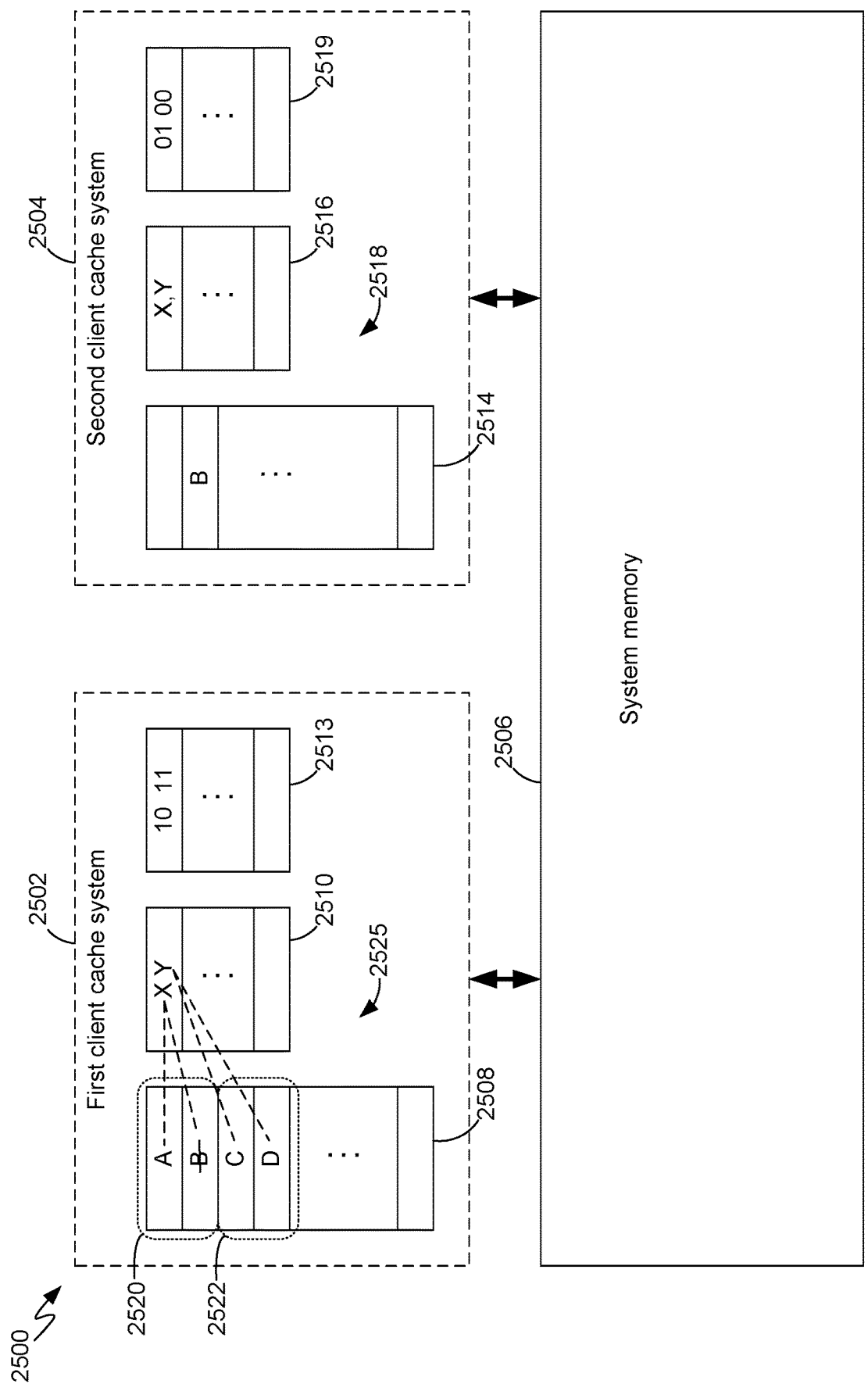
FIG. 25 is a functional block diagram similar to FIGS. 12-14 illustrating a state of operation in a system for providing cache coherency, in accordance with exemplary embodiments.

In FIG. 25 an example is shown in which a system 2500 is in a state in which metadata is to be generated in association with a writeback of data. In each of the other examples described above, it is contemplated that a client may transform data elements and generate metadata associated with the transformed data before the transformed data elements and the generated metadata are written back to a system memory. Nevertheless, in the above-described examples, metadata is generated on a per-tile basis. Therefore, to generate metadata for a tile it may be necessary for a client to have access to all data elements of a tile, not just the data elements that are to be written back to the system memory. The following features may address how a client may be provided with such access to other (i.e., non-owned) data elements of a tile that the client may need to generate metadata for the tile.

The system 2500 is similar to the system 1200 described above with regard to FIGS. 12-14. Accordingly, in a first client cache system 2502 a first cache storage region 2512 may be configured as a data region 2508 configured to store data elements in data cache lines, a metadata region 2510 configured to store metadata elements in metadata cache lines, and a tag region 2513 configured to store data state indicators corresponding to the data cache lines. Similarly, in a second client cache system 2504 a second cache storage region 2518 may be configured as a data region 2514 configured to store data elements in data cache lines, a metadata region 2516 configured to store metadata elements in metadata cache lines, and a tag region 2519 configured to store data state indicators corresponding to the metadata and data cache lines. In the illustrated example the metadata element X is associated with data elements A and B, which may form a tile 2520, and the metadata element Y is associated with data elements C and D, which may form a tile 2522. In the tag region 2513 a data state indicator having a value of "10 11" indicates that the first client cache system 2502 owns data elements A, C and D and their associated metadata elements but does not own data element B. Similarly, in the tag region 2519 a data state indicator having a value of "01 00" indicates that the second client cache system 2504 owns data element B and its associated metadata element Y but does not own other data elements (not shown in data region 2514 for purposes of clarity).

A feature may be included to address an example or instance of operation in which either the first client cache system 2502 is to write data element A to the system memory 2506 or the second client cache system 2504 is to write data element B to the system memory 2506. In the case of the first client cache system 2502 writing data element A to the system memory 2506, the first client may require access to data element B to generate metadata for the tile 2520. Similarly, in the case of the second client cache system 2504 writing data element B to the system memory 2506, the second client may require access to data element A to generate metadata.

The following feature may be included to address the case of the first client cache system 2502 writing data element A to the system memory 2506. The first client cache system 2502 may send data element A to the second client cache system 2504, in effect divesting the first client cache system 2052 of ownership of the data element A and transferring responsibility to the second client cache system 2504 for transforming data element A and writing back to the system memory 2506 the transformed data element A and metadata generated in association with the transformation. For example, the first client cache system 2502 may send an "intent to divest ownership" message to the second client cache system 2504, to which the second client cache system 2504 may respond with a message accepting the transfer or divestiture and then receiving the data element A from the first client cache system 2502. Alternatively, the first client cache system 2502 could push the data element A onto a system bus (not shown in FIG. 25), from which the second client cache system 2504 could intercept the data element A. Alternately, the first client cache system 2502 could push the data element A into the network and a central system (such as a snoop filter) could direct the data element A to the second client cache system 2504. As an alternative to providing the foregoing feature by which the first client cache system 2502 divests ownership of the data element A, a feature may be provided by which the first client cache system 2502 gains ownership of the needed data element B. For example, the first client cache system 2502 may snoop the second client cache system 2504 for the needed data element B, to which the second client cache system may respond by transferring the data element B and ownership thereof to the first client cache system 2502. Variations or enhancements to the foregoing schemes could include selecting between divestiture or gaining ownership based on criteria such as the number of lines in a tile, the age of data elements, etc. For example, the client cache system owning the most lines of the tile may gain ownership and the client cache system owning fewer lines of the tile may divest ownership. Alternatively, or as additional criteria in selecting between divestiture or gaining ownership, the client cache system owning the youngest (i.e., most recently worked on) tiles may be given more weight in a decision for that client cache system to gain ownership.

Figure 26:
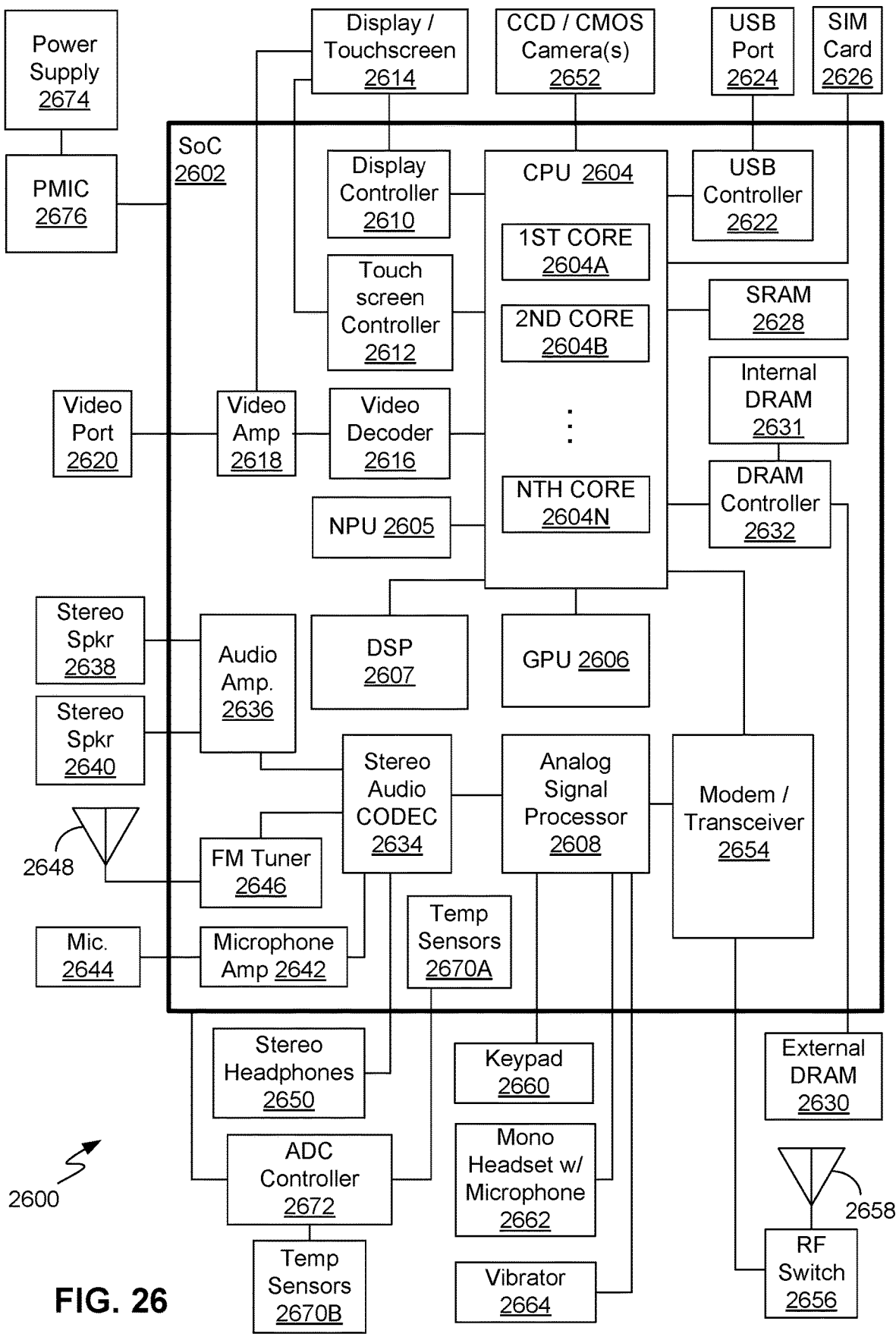
FIG. 26 is block diagram of a computing device, in accordance with exemplary embodiments.

FIG. 26 illustrates an example of a PCD 2600, such as a mobile phone or smartphone, in which exemplary embodiments of systems, methods, computer-readable media, and other examples of providing cache coherency may be provided. For purposes of clarity, some interconnects, signals, etc., are not shown in FIG. 26. Although the PCD 2600 is shown as an example, other embodiments of systems, methods, computer-readable media, and other examples of providing cache coherency may be provided in other types of computing devices or systems.

The PCD 2600 may include an SoC 2602. The SoC 2602 may include a CPU 2604, an NPU 2605, a GPU 2606, a DSP 2607, an analog signal processor 2608, a modem/modem subsystem 2654, or other processors. The CPU 2604 may include one or more CPU cores, such as a first CPU core 2604A, a second CPU core 2604B, etc., through an Nth CPU core 2604N.

The cores 2604A-2604N may operate as memory clients in the manner described above with regard to, for example, FIG. 1. Although not shown for purposes of clarity, the CPU 2604 may include client cache systems controlled by respective ones of the cores 2604A-2604N. Alternatively, or in addition, any of the processors, such as the NPU 2605, GPU 2606, DSP 2607, etc., may operate as clients and may include client cache systems.

A display controller 2610 and a touch-screen controller 2612 may be coupled to the CPU 2604. A touchscreen display 2614 external to the SoC 2602 may be coupled to the display controller 2610 and the touch-screen controller 2612. The PCD 2600 may further include a video decoder 2616 coupled to the CPU 2604. A video amplifier 2618 may be coupled to the video decoder 2616 and the touchscreen display 2614. A video port 2620 may be coupled to the video amplifier 2618. A universal serial bus ("USB") controller 2622 may also be coupled to CPU 2604, and a USB port 2624 may be coupled to the USB controller 2622. A subscriber identity module ("SIM") card 2626 may also be coupled to the CPU 2604.

One or more memories may be coupled to the CPU 2604. The one or more memories may include both volatile and non-volatile memories. Examples of volatile memories include static random access memory ("SRAM") 2628 and dynamic random access memory ("DRAM") 2630 and 2631. Such memories may be external to the SoC 2602, such as the DRAM 2630, or internal to the SoC 2602, such as the DRAM 2631. A DRAM controller 2632 coupled to the CPU 2604 may control the writing of data to, and reading of data from, the DRAMs 2630 and 2631. The DRAMs 2630 and 2631 may be examples of any of the system memories described above. The SRAM 2628 may be an example of the above-described local cache memory or a system-level cache memory.

A stereo audio CODEC 2634 may be coupled to the analog signal processor 2608. Further, an audio amplifier 2636 may be coupled to the stereo audio CODEC 2634. First and second stereo speakers 2638 and 2640, respectively, may be coupled to the audio amplifier 2636. In addition, a microphone amplifier 2642 may be coupled to the stereo audio CODEC 2634, and a microphone 2644 may be coupled to the microphone amplifier 2642. A frequency modulation ("FM") radio tuner 2646 may be coupled to the stereo audio CODEC 2634. An FM antenna 2648 may be coupled to the FM radio tuner 2646. Further, stereo headphones 2650 may be coupled to the stereo audio CODEC 2634. Other devices that may be coupled to the CPU 2604 include one or more digital (e.g., CCD or CMOS) cameras 2652.

A modem or RF transceiver 2654 may be coupled to the analog signal processor 2608 and the CPU 2604. An RF switch 2656 may be coupled to the RF transceiver 2654 and an RF antenna 2658. In addition, a keypad 2660, a mono headset with a microphone 2662, and a vibrator device 2664 may be coupled to the analog signal processor 2608.

The SoC 2602 may have one or more internal or on-chip thermal sensors 2670A and may be coupled to one or more external or off-chip thermal sensors 2670B. An analog-to-digital converter controller 2672 may convert voltage drops produced by the thermal sensors 2670A and 2670B to digital signals. A power supply 2674 and a PMIC 2676 may supply power to the SoC 2602.

Firmware or software may be stored in any of the above-described memories, such as DRAM 2630 or 2631, SRAM 2628, etc., or may be stored in a local memory directly accessible by the processor hardware on which the software or firmware executes. Execution of such firmware or software may control aspects of any of the above-described methods or configure aspects any of the above-described systems. Any such memory or other non-transitory storage medium having firmware or software stored therein in computer-readable form for execution by processor hardware may be an example of a "computer-readable medium," as the term is understood in the patent lexicon.

Implementation examples are described in the following numbered clauses:

1. A method for providing cache coherency, comprising:
    requesting to read, by a second client cache system, a data element having an associated metadata element;
    detecting the metadata element in a first client cache system in response to a read request by the second client cache system to read the metadata element;
    writing, by the first client cache system, one or more cache lines containing the metadata element and all data elements associated with the metadata element in response to detection of the metadata element in the first client cache system;
    invalidating, by the first client cache system, the metadata element in the first client cache system in response to the detection of the metadata element in the first client cache system; and
    completing the read request, including the second client cache system receiving the metadata element and all data elements associated with the metadata element.
2. The method of clause 1, wherein writing the one or more cache lines comprises writing at least one data element transformed using the metadata element.
3. The method of clause 1 or 2, wherein:
    writing the one or more cache lines comprises writing the one or more cache lines to a system memory; and
    completing the read request comprises reading, by the second client cache system, the one or more cache lines from the system memory.
4. The method of any of clauses 1-3, further comprising transforming, by the second client cache system, at least one data element read from the system memory using the metadata element.
5. The method of any of clauses 1-4, wherein:
    requesting to read the metadata element comprises providing a metadata hint identifying the metadata element from among a plurality of metadata elements in a cache line; and
    writing the one or more cache lines comprises writing the cache line containing the metadata element and writing one or more other cache lines containing only data elements associated with the metadata element identified by the metadata hint.
6. The method of any of clauses 1-5, wherein:
    requesting to read the metadata element comprises further providing a data hint identifying one or more data elements from among a plurality of data elements associated with the metadata element identified by the metadata hint; and
    writing the one or more cache lines comprises writing the cache line containing the metadata element and writing one or more other cache lines containing only the one or more data elements identified by the data hint.
7. The method of any of clauses 1-6, further comprising:
    storing, by the first client cache system, a pending state indication in association with the metadata element in the first client cache system before the read request by the second client cache system to read the metadata element;
    detecting the metadata element in the second client cache system, including detecting the pending state indication;

invalidating, by the second client cache system, one or more cache lines containing the metadata element and all data elements associated with the metadata element in response to detecting the metadata element in the second client cache system; and deferring completing the read request until after writing, by the first client cache system, the one or more cache lines containing the metadata element and all data elements associated with the metadata element.

8. The method of any of clauses 1-7, wherein writing the one or more cache lines comprises writing the one or more cache lines to a system memory, and deferring completion of the read request comprises reading, by the second client cache system, the one or more cache lines from the system memory.

9. A system for providing cache coherency, comprising:
a first client cache system; and
a second client cache system configured to provide a read request to read a data element having an associated metadata element and further configured to detect the metadata element in the first client cache system in response to the read request;
wherein the first client cache system is configured to write one or more cache lines containing the metadata element and all data elements associated with the metadata element in response to detection of the metadata element in the first client cache system, and the first client cache system is further configured to invalidate the metadata element in the first client cache system in response to the detection of the metadata element in the first client cache system; and
wherein the second client cache system is configured to complete the read request by being configured to receive the metadata element and all data elements associated with the metadata element.

10. The system of clause 9, wherein the first client cache system is configured to write the one or more cache lines by being configured to write at least one data element transformed using the metadata element.

11. The system of clause 9 or 10, wherein:
the first client cache system is configured to write the one or more cache lines by being configured to write the one or more cache lines to a system memory; and
the second client cache system is configured to complete the read request by being configured to read the one or more cache lines from the system memory.

12. The system of any of clauses 9-11, wherein the second client cache system is further configured to transform at least one data element read from the system memory using the metadata element.

13. The system of any of clauses 9-12, wherein:
the second client cache system is configured to provide the read request by being configured to include a metadata hint identifying the metadata element from among a plurality of metadata elements in a cache line; and
the first client cache system is configured to write the one or more cache lines by being configured to write the cache line containing the metadata element and writing one or more other cache lines containing only data elements associated with the metadata element identified by the metadata hint.

14. The system of any of clauses 9-13, wherein:
the second client cache system is configured to provide the read request by being configured to include a data hint identifying one or more data elements from among a plurality of data elements associated with the metadata element identified by the metadata hint; and
the first client cache system is configured to write the one or more cache lines by being configured to write one or more other cache lines containing only the one or more data elements identified by the data hint.

15. The system of any of clauses 9-14, wherein:
the first client cache system is configured to store a pending state indication in association with the metadata element in the first client cache system before the read request is provided;
the second client cache system is configured to detect the pending state indication stored in associated with the metadata element;
the second client cache system is configured to invalidate one or more cache lines containing the metadata element and all data elements associated with the metadata element in response to detection of the metadata element in the second client cache system; and
the second client cache system is configured to defer completion of the read request until after the first client cache system writes the one or more cache lines containing the metadata element and all data elements associated with the metadata element.

16. The system of any of clauses 9-15, wherein:
the first client cache system is configured to write the one or more cache lines by being configured to write the one or more cache lines to a system memory; and
the second client cache system is configured to complete the read request by being configured to read the one or more cache lines from the system memory.

17. A system for providing cache coherency, comprising:
means for requesting to read a data element having an associated metadata element;
means for detecting the metadata element in a first client cache system in response to a read request by the second client cache system to read the metadata element;
means for writing one or more cache lines containing the metadata element and all data elements associated with the metadata element in response to detection of the metadata element in the first client cache system;
means for invalidating the metadata element in the first client cache system in response to the detection of the metadata element in the first client cache system; and
means for completing the read request, including means for receiving the metadata element and all data elements associated with the metadata element in the second client cache system.

18. The system of clause 17, wherein the means for writing the one or more cache lines comprises means for writing at least one data element transformed using the metadata element.

19. The system of clause 17 or 18, wherein:
the means for writing the one or more cache lines comprises means for writing the one or more cache lines to a system memory; and
the means for completing comprises means for reading the one or more cache lines from the system memory.

20. The system of any of clauses 17-19, further comprising means for transforming at least one data element read from the system memory using the metadata element.

21. The system of any of clauses 17-20, wherein:
the means for requesting to read the metadata element comprises means for providing a metadata hint identifying the metadata element from among a plurality of metadata elements in a cache line; and the means for writing the one or more cache lines comprises means for writing the cache line containing the metadata element and one or more other cache lines containing only data elements associated with the metadata element identified by the metadata hint.

22. The system of any of clauses 17-21, wherein:
the means for requesting to read the metadata element comprises means for providing a data hint identifying one or more data elements from among a plurality of data elements associated with the metadata element identified by the metadata hint; and
the means for writing the one or more cache lines comprises means for writing the cache line containing the metadata element and one or more other cache lines containing only the one or more data elements identified by the data hint.

23. The system of any of clauses 17-22, further comprising:
means for storing a pending state indication in association with the metadata element in the first client cache system before the read request by the second client cache system to read the metadata element;
the means for detecting the metadata element in the second client cache system comprises means for detecting the pending state indication, wherein the means for invalidating comprises means for invalidating one or more cache lines containing the metadata element and all data elements associated with the metadata element; and
means for deferring completing the read request until after the means for writing completes writing the one or more cache lines containing the metadata element and all data elements associated with the metadata element.

24. The system of any of clauses 17-23, wherein the means for writing the one or more cache lines comprises means for writing the one or more cache lines to a system memory, and the means for deferring completion of the read request comprises means for reading the one or more cache lines from the system memory.

25. A computer-readable medium for providing cache coherency, the computer-readable medium comprising a non-transitory computer-readable medium having instructions stored thereon in computer-executable form, the instructions when executed by a processing system of a computing device configuring the processing system to control:
requesting to read, by a second client cache system, a data element having an associated metadata element;
detecting the metadata element in a first client cache system in response to a read request by the second client cache system to read the metadata element;
writing, by the first client cache system, one or more cache lines containing the metadata element and all data elements associated with the metadata element in response to detection of the metadata element in the first client cache system;
invalidating, by the first client cache system, the metadata element in the first client cache system in response to the detection of the metadata element in the first client cache system; and
completing the read request, including the second client cache system receiving the metadata element and all data elements associated with the metadata element.

26. The computer-readable medium of clause 25, wherein the instructions configure the processing system to control writing the one or more cache lines by configuring the processing system to control writing at least one data element transformed using the metadata element.

27. The computer-readable medium of clause 25 or 26, wherein:
the instructions configure the processing system to control writing the one or more cache lines by configuring the processing system to control writing the one or more cache lines to a system memory; and
the instructions configure the processing system to control completing the read request by configuring the second client cache system to read the one or more cache lines from the system memory.

28. The computer-readable medium of any of clauses 25-27, further comprising instructions configuring the processing system to control transforming at least one data element read from the system memory using the metadata element.

29. The computer-readable medium of any of clauses 25-28, wherein:
the instructions configure the processing system to control requesting to read the metadata element by configuring the processing system to provide a metadata hint identifying the metadata element from among a plurality of metadata elements in a cache line; and
the instructions configure the processing system to control writing the one or more cache lines by configuring the processing system to control writing the cache line containing the metadata element and writing one or more other cache lines containing only data elements associated with the metadata element identified by the metadata hint.

30. The computer-readable medium of any of clauses 25-29, wherein:
the instructions configure the processing system to control requesting to read the metadata element by configuring the processing system to provide a data hint identifying one or more data elements from among a plurality of data elements associated with the metadata element identified by the metadata hint; and
the instructions configure the processing system to control writing the one or more cache lines by configuring the processing system to control writing the cache line containing the metadata element and writing one or more other cache lines containing only the one or more data elements identified by the data hint.

31. The computer-readable medium any of clauses 25-30, further comprising instructions configuring the processing system to control:
storing, by the first client cache system, a pending state indication in association with the metadata element in the first client cache system before the read request by the second client cache system to read the metadata element;
detecting the metadata element in the second client cache system, including detecting the pending state indication;
invalidating, by the second client cache system, one or more cache lines containing the metadata element and all data elements associated with the metadata element in response to detecting the metadata element in the second client cache system; and
deferring completing the read request until after writing, by the first client cache system, the one or more cache lines containing the metadata element and all data elements associated with the metadata element.

Alternative embodiments will become apparent to one of ordinary skill in the art to which the invention pertains.

Therefore, although selected aspects have been illustrated and described in detail, it will be understood that various substitutions and alterations may be made therein.

What is claimed is:

1. A method for providing cache coherency, comprising:
requesting to read, by a second client cache system, a data element having an associated metadata element;
detecting the metadata element in a first client cache system in response to a read request by the second client cache system to read the metadata element;
writing, by the first client cache system, one or more cache lines containing the metadata element and all data elements associated with the metadata element in response to detecting the metadata element in the first client cache system;
invalidating, by the first client cache system, the metadata element in the first client cache system in response to the detection of the metadata element in the first client cache system;
completing the read request, including the second client cache system receiving the metadata element and all data elements associated with the metadata element;
writing the one or more cache lines comprises writing the one or more cache lines to a system memory; and
completing the read request comprises reading, by the second client cache system, the one or more cache lines from the system memory.

2. The method of claim 1, wherein writing the one or more cache lines comprises writing at least one data element transformed using the metadata element.

3. The method of claim 1, further comprising transforming, by the second client cache system, at least one data element read from the system memory using the metadata element.

4. The method of claim 1, wherein:
requesting to read the metadata element comprises providing a metadata hint identifying the metadata element from among a plurality of metadata elements in a cache line; and
writing the one or more cache lines comprises writing the cache line containing the metadata element and writing one or more other cache lines containing only data elements associated with the metadata element identified by the metadata hint.

5. The method of claim 4, wherein:
requesting to read the metadata element comprises further providing a data hint identifying one or more data elements from among a plurality of data elements associated with the metadata element identified by the metadata hint; and
writing the one or more cache lines comprises writing the cache line containing the metadata element and writing one or more other cache lines containing only the one or more data elements identified by the data hint.

6. The method of claim 1, further comprising:
storing, by the first client cache system, a pending state indication in association with the metadata element in the first client cache system before the read request by the second client cache system to read the metadata element;
detecting the metadata element in the second client cache system, including detecting the pending state indication;
invalidating, by the second client cache system, one or more cache lines containing the metadata element and all data elements associated with the metadata element in response to detecting the metadata element in the second client cache system; and
deferring completing the read request until after writing, by the first client cache system, the one or more cache lines containing the metadata element and all data elements associated with the metadata element.

7. The method of claim 6, wherein writing the one or more cache lines comprises writing the one or more cache lines to a system memory, and deferring completion of the read request comprises reading, by the second client cache system, the one or more cache lines from the system memory.

8. A system for providing cache coherency, comprising:
a first client cache system; and
a second client cache system configured to provide a read request to read a data element having an associated metadata element and further configured to detect the metadata element in the first client cache system in response to the read request;
wherein the first client cache system is configured to write one or more cache lines containing the metadata element and all data elements associated with the metadata element in response to detecting the metadata element in the first client cache system, and the first client cache system is further configured to invalidate the metadata element in the first client cache system in response to the detection of the metadata element in the first client cache system;
wherein the second client cache system is configured to complete the read request by being configured to receive the metadata element and all data elements associated with the metadata element;
the first client cache system is configured to write the one or more cache lines by being configured to write the one or more cache lines to a system memory; and
the second client cache system is configured to complete the read request by being configured to read the one or more cache lines from the system memory.

9. The system of claim 8, wherein the first client cache system is configured to write the one or more cache lines by being configured to write at least one data element transformed using the metadata element.

10. The system of claim 8, wherein the second client cache system is further configured to transform at least one data element read from the system memory using the metadata element.

11. The system of claim 8, wherein:
the second client cache system is configured to provide the read request by being configured to include a metadata hint identifying the metadata element from among a plurality of metadata elements in a cache line; and
the first client cache system is configured to write the one or more cache lines by being configured to write the cache line containing the metadata element and writing one or more other cache lines containing only data elements associated with the metadata element identified by the metadata hint.

12. The system of claim 11, wherein:
the second client cache system is configured to provide the read request by being configured to include a data hint identifying one or more data elements from among a plurality of data elements associated with the metadata element identified by the metadata hint; and
the first client cache system is configured to write the one or more cache lines by being configured to write one or more other cache lines containing only the one or more data elements identified by the data hint.

13. The system of claim 8, wherein:
the first client cache system is configured to store a pending state indication in association with the metadata element in the first client cache system before the read request is provided;
the second client cache system is configured to detect the pending state indication stored in associated with the metadata element;
the second client cache system is configured to invalidate one or more cache lines containing the metadata element and all data elements associated with the metadata element in response to detecting the metadata element in the second client cache system; and
the second client cache system is configured to defer completion of the read request until after the first client cache system writes the one or more cache lines containing the metadata element and all data elements associated with the metadata element.

14. The system of claim 13, wherein:
the first client cache system is configured to write the one or more cache lines by being configured to write the one or more cache lines to a system memory; and
the second client cache system is configured to complete the read request by being configured to read the one or more cache lines from the system memory.

15. A computer-readable medium for providing cache coherency, the computer-readable medium comprising a non-transitory computer-readable medium having instructions stored thereon in computer-executable form, the instructions when executed by a processing system of a computing device configuring the processing system to control:
requesting to read, by a second client cache system, a data element having an associated metadata element;
detecting the metadata element in a first client cache system in response to a read request by the second client cache system to read the metadata element;
writing, by the first client cache system, one or more cache lines containing the metadata element and all data elements associated with the metadata element in response to detecting the metadata element in the first client cache system;
invalidating, by the first client cache system, the metadata element in the first client cache system in response to the detection of the metadata element in the first client cache system;
completing the read request, including the second client cache system receiving the metadata element and all data elements associated with the metadata element;
writing the one or more cache lines by configuring the processing system to control writing the one or more cache lines to a system memory; and
completing the read request by configuring the second client cache system to read the one or more cache lines from the system memory.

16. The computer-readable medium of claim 15, wherein the instructions configure the processing system to control writing the one or more cache lines by configuring the processing system to control writing at least one data element transformed using the metadata element.

17. The computer-readable medium of claim 15, further comprising instructions configuring the processing system to control transforming at least one data element read from the system memory using the metadata element.

18. The computer-readable medium of claim 15, wherein:
the instructions configure the processing system to control requesting to read the metadata element by configuring the processing system to provide a metadata hint identifying the metadata element from among a plurality of metadata elements in a cache line; and
the instructions configure the processing system to control writing the one or more cache lines by configuring the processing system to control writing the cache line containing the metadata element and writing one or more other cache lines containing only data elements associated with the metadata element identified by the metadata hint.

19. The computer-readable medium of claim 18, wherein:
the instructions configure the processing system to control requesting to read the metadata element by configuring the processing system to provide a data hint identifying one or more data elements from among a plurality of data elements associated with the metadata element identified by the metadata hint; and
the instructions configure the processing system to control writing the one or more cache lines by configuring the processing system to control writing the cache line containing the metadata element and writing one or more other cache lines containing only the one or more data elements identified by the data hint.

* * * * *